United States Patent [19]

Guimbal

[11] Patent Number: 4,915,585

[45] Date of Patent: Apr. 10, 1990

[54] ROTARY-WING AIRCRAFT ROTOR HEAD HAVING RESILIENT-RETURN INTERBLADE TIES WITH BUILT-IN DAMPING

[75] Inventor: Bruno Guimbal, Chateauneuf-les-Martigues, France

[73] Assignee: Aerospatiale Societe National Industrielle, Paris, France

[21] Appl. No.: 343,305

[22] Filed: Apr. 26, 1989

[30] Foreign Application Priority Data

Apr. 29, 1988 [FR] France ................... 88 05816

[51] Int. Cl.⁴ .................................... B64C 27/38
[52] U.S. Cl. ....................... 416/140; 416/107; 416/141
[58] Field of Search .......... 416/140 A, 141 A, 138 A, 416/140 R, 141 R, 106, 107

[56] References Cited

U.S. PATENT DOCUMENTS

| 1,948,458 | 2/1934 | De La Cierva | 416/140 A X |
|---|---|---|---|
| 2,494,985 | 1/1950 | Campbell | 416/106 |
| 2,640,553 | 6/1953 | Hafner | 416/106 |
| 2,640,554 | 6/1953 | Campbell | 416/106 |
| 3,302,726 | 2/1967 | Stanley | 416/106 |
| 3,310,119 | 3/1967 | Watson | 416/140 A X |
| 3,361,216 | 1/1968 | Walker | . |
| 3,762,834 | 10/1973 | Bourquardez et al. | 416/140 A X |
| 3,807,897 | 4/1974 | Lucien | 416/140 A |
| 4,342,540 | 8/1982 | Lovera et al. | 416/141 X |
| 4,512,717 | 4/1985 | Pancotti et al. | 416/138 A X |
| 4,568,245 | 2/1986 | Hibyan et al. | 416/134 |

FOREIGN PATENT DOCUMENTS

| 3148903A1 | 6/1983 | Fed. Rep. of Germany . | |
|---|---|---|---|
| 1442684 | 5/1966 | France | 416/140 A |
| 1465027 | 1/1967 | France | 416/107 |
| 1465027 | 1/1967 | France | |
| 2125150 | 9/1972 | France . | |
| 2486492 | 3/1978 | France . | |
| 2584995 | 2/1987 | France . | |
| 602994 | 6/1948 | United Kingdom | 416/140 X |
| 643474 | 9/1950 | United Kingdom | 416/106 |
| 654757 | 6/1951 | United Kingdom | 416/140 A |

Primary Examiner—Everette A. Powell, Jr.
Attorney, Agent, or Firm—Armstrong, Nikaido, Marmelstein, Kubovcik and Murray

[57] ABSTRACT

The invention relates to a rotor head having interblade ties with resilient return in lag and with built-in damping, wherein each tie is connected, to each of the two rotor blades joined by it, by articulation means comprising a main ball retained on a member connecting a blade to the hub and centered on or in immediate proximity to the pitch change axis of the corresponding blade.

A single main ball may be connected to the adjacent ends of two neighboring ties by a connection member having the shape of a V open towards the hub, or else each tie is connected to a connection member by a respective one of two main balls offset transversely in relation to the pitch change axis of the blade and/or radially along said axis.

Application to the main and/or auxiliary rotors of helicopters.

26 Claims, 5 Drawing Sheets

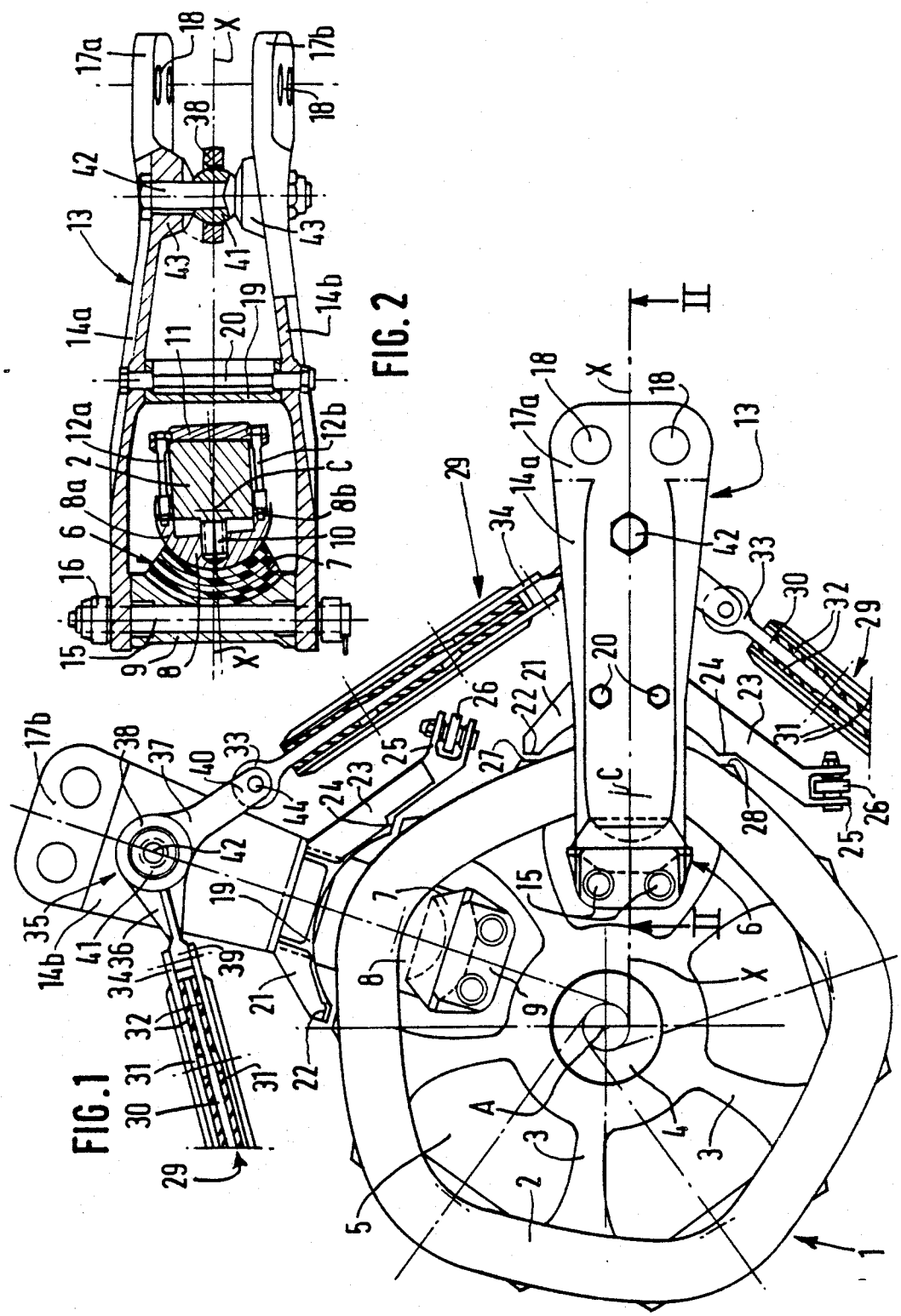

ROTARY-WING AIRCRAFT ROTOR HEAD HAVING RESILIENT-RETURN INTERBLADE TIES WITH BUILT-IN DAMPING

FIELD OF THE INVENTION

The present invention relates to rotors, particularly the rotors of rotary-wing aerodynes whose articulated head is equipped with a drag interblade connector device comprising resilient return ties with built-in damping the number of the ties being equal to the number of blades and each of them being installed between two neighboring or adjacent blades or between the means connecting two neighboring blades to the hub.

The invention relates more particularly to the main or lift rotors of helicopters, whose head is provided with an interblade connector device of the type defined above and each blade of which is advantageously connected to the hub by connection and articulation means advantageously comprising a single articulation for flapping, lag and pitch.

In the best form of construction of the rotor head to which the invention relates the single flapping, lag and pitch articulation included in the means articulating each rotor blade to the hub is advantageously one of the so-called "laminated spherical thrust bearing" type comprising—between two frames rigidly connected to the hub, in the one case, and, in the other case, to the root of the blade or to a member, such as a clevis or a sleeve, connecting the root of the blade to the hub—an alternating stack, in the form of portions of a sphere, of rigid cups and sheets of an elastic material which have a common center and simultaneously effect, on the one hand the transmission to the hub of centrifugal forces originating from the blade through the axial compression of the laminated thrust bearing and, on the other hand, the angular flapping lag or drag and pitch movements of the blade relative to the hub through the deformation of the elastic spherical sheets of the laminated thrust bearing about their common center.

PRIOR ART

In order to damp the angular lag oscillations of the blades there have been proposed numerous constructions of resilient-return braces with built-in damping, of the viscoelastic, hydroelastic or other type, which are sometimes called blade lag dampers or blade lag frequency adaptors and which are interposed between the rim or the peripheral edge of the rotor hub, to which each blade can be connected by means comprising a single spherical elastomer articulation for lag, flapping and pitch, and the blade root or a member connecting the blade root to the hub, such as a sleeve or a clevis. Examples of such braces are described in French Patent Nos. 2,528,382, 2,573,829 and 2,592,696.

In comparison with this well known type of mounting, in which the resilient return and the damping of the angular lag movements of each blade are effected simultaneously but independently of the other blades because of the attachment to the hub of one end of the two end articulations of the brace, whose other end articulation is connected to the blade, the interblade arrangement of resilient return ties with built-in damping is more advantageous in respect of the general installation architecture, mass, dimensions, parasitic lag of the rotor, and also in respect of reliability, essentially because it makes it possible to eliminate from the hub itself any attachment for the resilient return and the damping of the driven blades.

The braces connecting the blades to the hub have in fact defects in respect of reliability and strength, because they are stressed by forces transmitted to them by short lever arms at the articulation joints of each brace, so that these articulations are subjected to substantial angular oscillations and forces. In addition, the clevis fastening the brace to the hub must be fixed in a zone of the hub which is the most critical, particularly when the hubs are made of composite material, more especially integrated tubular mast hubs. Furthermore, a problem of dimensions arises, which is linked to problems of installation and dimensioning resulting from the need to dispose not only the clevis for the attachment of the brace on the hub but also a pitch control lever for the corresponding blade, which must be disposed in the same zone. This also has the consequence that the radius of the attachment of the blade by its root on a sleeve or clevis making the connection to the hub is large, especially if it is desired to fold back the blade. In a general way the space available near the hub is too small to allow the accommodation of braces or lag dampers, or else lag frequency adaptors, which are very stiff and are subjected to considerable forces and therefore have large dimensions and mass, giving rise at the same time to a not negligible increase of the aerodynamic drag of the entire rotor, not to mention the fact that the hydroelastic damping braces, which make it possible to seek an acceptable compromise between moderate stiffness and high damping, pose specific problems of reliability and leaktightness where the hydraulic damper is concerned.

It is for all these reasons that various interblade connection devices utilizing resilient ties and in some cases with built-in damping were proposed a long time ago, particularly in French Patent Nos. 948,640, 1,465,027, 2,125,150 and in U.S. Pat. Nos. 2,494,985 and 3,302,726.

The use of resilient return interblade ties with built-in damping makes it possible to regulate the natural frequencies and the lag damping of the blades in relation to one another and not individually in relation to the hub, thus opposing out-of-phase lag oscillations of the blades without opposing in-phase lag oscillations, which are free; this has the effect of displacing the natural transmission modes and eliminating all damping for this type of oscillations. Another effect of interblade connection utilizing resilient return ties with built-in damping, where the operation of the rotor head is concerned, is that the blades assume a position of equilibrium in lag as if they were each connected to the hub and freely articulated on the latter. For ground resonance the first vibratory mode in lag is of influence only through the rotational unbalance caused by the phase displacement of the blades relative to each other, and not through their individual movement relative to the hub.

This operating principle of an interblade connection device is confirmed in French Patent No. 1 465 027 relating to a helicopter rotor having a rigid hub and articulated blades. On this rotor each blade makes its angular lag oscillations about a pivot parallel to the axis of rotation of the hub and on the free end of a radial arm of the rigid hub, and each blade is connected to each of the two neighboring blades of the rotor by a tie or connection device comprising resilient means and damping means. By one of its ends each tie is articulated on a strap connecting a blade to the corresponding radial arm of the hub, in a zone of said strap which lies ahead of the pitch change axis of said blade, in relation to the direction of rotation of the rotor. The other end of the tie is also articulated on the blade connection strap of the blade immediately preceding the corresponding arm of the hub, but in a zone of said strap which is situated in rear of the pitch change axis of said preceding blade. Each connection strap has a generally triangular shape and is rigidly connected to the corresponding blade by one side of the triangle and pivoted on the corresponding radial arm of the hub by the apex opposite said side, while the connection on strap is articulated by each of the other two apices of the triangle on one of the two ties articulated to said strap, so that the articulations on the ties are offset to the greatest possible extent, taking into account the dimensions of the connection strap, one of them towards the front and the other towards the rear in relation to the pitch change axis of the corresponding blade. In this way the articulations of the two ends of a tie and the articulations on the hub of the two blades connected together by said tie form a deformable articulated quadrilateral, which is a parallelogram when the angular lag oscillations of the blades are zero or in phase.

French Patent Ser. No. 948,640 describes a helicopter rotor in which each blade is connected by its root to a blade support mounted, for pivoting about a lag axis, on a radial member pivoted on the rotor hub about a flapping axis situated radially inside the lag axis, in relation to the center of the hub, and along the pitch change axis of the blade, the root of which is coupled to a lever controlling the pitch of the blade in question. Each blade support carries two side legs which extend in the plane of rotation of the blades and project radially outwards and, at the same time, forwards for one leg and rearwards for the other leg in relation to the pitch axis of the blade, relative to the direction of rotation of the rotor, each of these legs being formed at its end as a ball joint eye. Ties each extend between two neighbouring blades, to each of which the corresponding tie is connected by a universal joint, which articulates it on the side leg on the corresponding side on the support of the corresponding blade. Each tie comprises two tubes partially nested telescopically one in the other, the free end of each of them carrying a ball held in the ball joint eye of the side leg on the corresponding side, on the support of one of the two blades connected to one another by said tie, and the two tubes of the latter are each fastened to one of two straps, which are radial relative to the common axis of the tubes and which are spaced apart and have inserted between them at least one block, sleeve or ring of elastic material, such as rubber. Each ball joint permits limited universal movement between the tie and the blade support which are articulated to one another by said ball joint, and the rubber members are designed to absorb small periodic displacements due to higher order harmonics of the vibratory conditions of each blade, independently of the other blades, to which these small displacements are not transmitted, while these rubber members are compressed or stretched with an amplitude such that movements of high amplitude of a blade are transmitted to the next blade by a tie. In particular, the independent angular oscillatory lag movements of each blade are absorbed by the elastic members, which return the two telescopic tubes of each tie to their starting position, while movements of high amplitude in lag are transmitted positively from one blade to the next by the ties, and are thus made simultaneously by all the blades. Similarly, the angular flapping oscillations of low amplitude, made independently by each blade, are absorbed by the elastic members, the absorption capacity of which is exceeded by high amplitude flapping transmitted from one blade to the other and giving rise to a variation of the taper angle of the rotor. This Patent Ser. No. 948 640 provides for the replacement of the elastic members by hydraulic means for the purpose of making the connection between the telescopic tubes of each tie. However, in all cases the elastic members or the hydraulic means are selected in such a manner as to provide a high degree of damping and great resistance to movements, so as to permit effective elimination or reduction of the vibrations of one blade relative to another. In a rotor of this kind no other damping is provided for the blades than that due to the relative friction of the two parts pivoting in relation to each other on the lag articulation and through the hysteresis of the material of which the elastic members are made (this material thus being a viscoelastic material), or by the hydraulic damping means.

French Pat. No. 2,125,150 describes a rotor whose hub of plastic material reinforced with high resistance fibers has, for the support of each of the blades, a flexible arm reinforced with a radial bundle of these fibers and provided, near the central part of the hub, with a flattened cross-section (in the direction at right angles to the axis of the hub) evolving into a circular section at the free end of the arm, which terminates in a substantially radial cylinder portion on which is fixed a cylindrical sleeve serving as pivot for a bush fastened to the root of the corresponding blade. In this way the flexible arm permits the angular flapping and lag oscillations of the blade, and the virtual lag axis of the blade, in the direction of the pitch change axis and in relation to the center of the hub, is situated radially on the outside of the virtual flapping axis of the blade, but radially inside its incidence articulation, which is interposed between the blade and the corresponding flexible arm of the hub and consists of the bush and the sleeve enabling the blade to swivel about its longitudinal pitch change axis. In the variant shown in FIG. 5 of this French patent short-stroke lag dampers are provided, each disposed between two neighboring blades, on which the damper is retained by its ends fixed to lugs on the sleeves of the two blades. At its radially inner end each sleeve carries two lugs or pairs of lugs projecting laterally relative to the pitch axis of the blade, one of them being directed towards the front and the other towards the rear of said pitch axis, referring to the direction of rotation of the rotor, so that the connection of a lag damper to a sleeve will be, in the radial direction, on the inside of the pitch change articulation and on the outside of the virtual flapping articulation, and substantially in the zone of the virtual lag axis but considerably offset laterally relative to said virtual lag axis.

U.S. Pat. No. 2,494,985 describes a lag damper device for the blades of the rotor of a rotating-wing aircraft, the head of which rotor is articulated. The hub has a central part supporting a radial arm for each blade and the end of each arm is arranged as a clevis in which a first pivot is mounted for swivelling about an axis parallel to the axis of rotation of the hub. Each blade has a blade root in the form of a cylindrical sleeve mounted for swivelling, with the aid of bearings, about a second pivot, which is radial and with which the sleeve forms the incidence change articulation of the blade. This radial pivot is extended towards the center of the rotor by a clevis mounted for pivoting about a third pivot, whose axis is simultaneously at right angles to the pitch change axis of the blade and to the axis of the first pivot. This third or flapping pivot passes through a central core, which in turn is mounted for pivoting with the first pivot between the two branches of the end clevis of the corresponding hub arm, so that the first pivot is the lag pivot, and the central core is mounted as a universal joint on the lag and flapping pivots, whose axes, at right angles to each other, intersect on the pitch axis of the corresponding blade but radially on the inside of the pitch change articulation. A V-shaped lever is rigidly connected by its base to the lag pivot, and its two arms extend simultaneously radially towards the corresponding blade (that is to say outwards relative to the center of the hub) and laterally, one towards the front and the other towards the rear of the pitch axis of the blade, relative to the direction of rotation of the hub, so that its arms pivot with the blade about the lag axis. An elongated lag damper is mounted by two end clevises for pivoting about axes parallel to the lag axes, on one side on the free end of the front arm of the V-shaped lever connected to the lag pivot of one blade, and on the other side on the free end of the rear arm of the V-shaped lever connected to the lag pivot of the blade immediately preceding in the direction of rotation of the rotor, so that only axial loads are transmitted from the arms to the damper when the two blades are subjected to out-of phase angular lag oscillations. The lag damper is arranged to change length with damping when the relative positions of the two blades connected by it are changed. The lag damper is provided with an elongated central plate carrying an end clevis and engaged between two elongated lateral plates carrying friction linings applied against the opposite faces of the central plate, and with two transversal spring mechanisms effecting adjustable gripping or clamping of the central plate between the friction linings of the two lateral plates, which form the other end clevis, in order to brake any axial displacement of the central plate relative to the two lateral plates. However, this damper provides no resilient return of the two blades connected by it to a relative initial position, and, because of the shape and the mounting of the V-shaped levers fixed for rotation with the blades about the corresponding lag pivots, a damper and the two lever arms connecting it to two neighbouring blades form a deformable quadrilateral, which is an articulated parallelogram when the angular lag oscillations are zero or in phase, the effective articulation of each damper on a blade being laterally offset to a considerable extent from the pitch axis of the blade in question, because it is situated at the free end of the corresponding arm of the V-shaped lever and not at the pivot point of the lever on the end clevis of the radial arm of the hub, as the V-shaped lever is fastened to the blade in its angular lag deflections.

U.S. Pat. No. 3,302,726 describes an articulated rotor head having blades connected in pairs by linear lag dampers provided with friction members, this rotor head being equivalent to that described in U.S. Pat. No. 2,494,985 analyzed above, except with regard to the precise structure of each damper, which is provided with resilient bands surrounding the members mounted to slide and to rub against each other, so that the friction, and consequently the damping, is increased when the amplitude of the relative lag displacement of the two blades connected by it increases, because of the deformation to which the resilient bands are then subjected; said bands then additionally exert a certain return action, towards their initial position, on the friction members. However, with regard to the pivotal mounting of each end of each damper on the free end of an arm of a V-shaped lever opening radially towards the outside and fastened by its base to rotate with the blade about the lag axis, which intersects the flapping axis on the pitch change axis of the corresponding blade but radially on the inside of the pitch change articulation, this rotor head is directly equivalent to that of U.S. Pat. No. 2,494,985.

All these known solutions therefore propose the articulation of each end of a tie or lag damper on an arm or support foot fastened to the member which, in the lag articulation of a corresponding blade, is driven with the blade in its angular lag oscillations, so that it pivots with the blade about its lag axis, and in such a manner that the center of the articulation of each end of the tie or of the lag damper is considerably offset laterally from the pitch change axis of that blade and lies radially on the outside of the lag axis, so that the centers of the articulations of the two ends of a tie or lag damper and the lag axes of the two blades connected by said tie are at the four apices of a deformable articulated quadrilateral. This has the consequence that the articulations of the ends of each lag damper are not stressed by the pitch change movements of the two corresponding blades, whose pitch articulations are situated radially on the outside of the lag axes. In addition, the rotor heads of U.S. Pat. Nos. 2,494,985 and 3,302,726 and of French Patent Ser. No. 948,640 are articulated and are provided, for each blade, with flapping, lag and pitch articulations made in the form of independent pivots disposed between a rigid part of the hub and the blade attachment means, in such a manner that in the two American patents the flapping and lag articulations are at the same level, whereas the blade pitch articulation is radially offset towards the interior in relation to the center of the hub, whereas in the French Patent Ser. No. 948,640 the flapping articulation is radially offset on the inside of the lag articulation, which in turn is radially offset on the inside of the pitch articulation, which also corresponds to general configuration found in the rotor head of French Pat. No. 2,125,150, in which the flexible radial arms of the hub have virtual flapping and lag articulations.

The consequence therefore is that in the last two patents mentioned the attachment means of the ends of the ties or lag dampers are also stressed by the flapping movements of the blades, thus entailing an undesirable coupling of lag and flapping.

It is also important to note that the articulated rotor heads provided for each blade with an actual lag articulation, formed about a lag axis parallel to the axis of rotation of the rotor, and equipped with interblade ties as proposed in the abovementioned prior art documents, are rotor heads which no longer correspond to the architecture of the rotors of advanced design fitted on modern helicopters now on the market, particularly rotors which have blades and/or hubs of composite material and in which the blades are connected to the hub by articulations which themselves are likewise essentially composite.

SUMMARY OF THE INVENTION

The problem underlying the invention is to overcome the disadvantages indicated above, and the invention seeks to provide a rotor head equipped with interblade ties and the mounting of which enables each tie to be stressed only by the angular lag movements of the blades relative to each other, these angular lag movements being completely disconnected from the angular pitch and flapping movements.

Another aim of the invention is to provide a rotor head in which each interblade tie makes it possible to introduce not only damping but also a powerful resilient return in the angular lag movements of the blades in relation to each other. Finally, yet another aim of the invention is to provide a mounting of the interblade ties which is compatible with rotor heads of advanced design and of the the type comprising for each blade a single thrust bearing articulation transmitting to the hub the centrifugal forces and shearing forces originating from the blades and giving, about a single central point of the thrust bearing articulation, the three degrees of freedom of the blade in respect of flapping, lag and pitch, without the existence on the rotor head of a physical lag axis about which the angular lag oscillations of a corresponding blade are made, while the means directly connecting each blade to said thrust bearing articulation, namely the blade root, which in turn is in the form of a clevis or connection sleeve, or else an independent member shaped as a clevis or connection sleeve, undergoes combined angular flapping, lag and pitch movements.

To this end the object of the invention is a rotor head of known type, comprising a hub to which each blade of the rotor is held by a connection member fixed to the blade and connected to the hub with the aid of articulation means permitting angular oscillations of the blade about a single point on which the flapping axis, the lag axis and the pitch change axis are convergent, the rotor head also comprising an interblade connection device consisting of elongated resilient-return ties with built-in damping, the number of which ties is equal to that of the blades and which are mounted substantially in a ring around the hub, so that each of them connects together two neighboring blades of the rotor, each tie comprising at least two rigid elongated members, each of which is provided with means for the articulated connection of a respective end of the tie to a respective one of the two blades connected by said tie, and which are connected to one another by at least one resilient-return member of the two rigid members, for return to a relative initial position, and by at least one member damping all relative movement of the two rigid members, at least in the longitudinal direction of the tie, and according to the invention a rotor head of this kind is characterized in that the means for the articulated connection of each tie to a blade comprise a main ball whose center is situated on or in immediate proximity to the longitudinal pitch axis of the blade and which is retained, on the means connecting the blade to the hub, radially on the outside, relative to the center of the hub, of the point of intersection of the lag, flapping and pitch change axes of the blade, which point constitutes the single center of articulation of the means making the connection to the hub. In this way the controlled oscillatory movements of the blade about its pitch change axis give rise to no parasitic stressing of the ties connected to it, and this is very favorable in respect of their life and their dimensions because of a reduction of weight and size.

At the same time it is advantageous that the means articulating the connection member of a blade on the hub comprise a thrust bearing articulation of the laminated spherical type constituting at one and the same time a lag articulation a flapping articulation and a pitch articulation, with its center al the intersection of the flapping, lag and pitch axes of the corresponding blade, thus providing the advantage of eliminating the principal parasitic couplings on the rotor head.

In a first preferred embodiment the means for the articulated connection of two neighboring ties on one and the same blade comprise a single main ball whose center is situated on the pitch change axis of the blade.

In this case it is advantageous for the single main ball to be connected to the adjacent ends of the two neighboring ties by a rigid connection member comprising two arms radially inclined towards the hub and disposed laterally one on one side and the other on the other side of the pitch change axis of the blade, the two arms being attached to one another by a ball eye surrounding the main ball, and the free end of one of the arms being connected to the adjacent end of the tie situated on the corresponding side of the pitch axis of the blade by connection means making a secondary articulated connection, in such a manner that in the relative initial position of the rigid members of each tie the centers of the main balls connecting each tie to the two corresponding blades and the center of the secondary articulated connection of each tie to the corresponding arms of the members making the connection to the two corresponding blades are substantially aligned on the longitudinal axis of the tie, thus enabling misalignment to be taken up.

It is advantageous for the connection member to have the shape of a V open towards the hub, with the free end of one of the arms in the form of a pivot clevis or pivot eye on the adjacent end of a tie, the pivoting axis of the clevis or of the eye on the free end of an arm being parallel to the axis of the main ball, which is likewise substantially parallel to the lag axis of the blade, so as to ensure good overall stability in compression, with the aid of V-shaped connection members which are extremely easy and inexpensive to produce.

In this case a connection eye fastened to one of the rigid members of a tie may advantageously be engaged and held between the two branches of an end clevis of an arm of a connection member.

In order to absorb small movements due to higher flapping harmonics and to movements of the blades when the rotor is stopped, occurring at the secondary articulated connection means, that is to say between one end of a tie and the free end of a corresponding arm of a member making the connection to a blade, the connection eye of a tie is advantageously held in the end clevis of the arm of the connection member by a ball of laminated elastomer material.

In a second preferred form of construction of the rotor head according to the invention the articulated connection means of each of two neighboring ties on one and the same blade comprise a respective one of two main balls disposed on the corresponding connection member symmetrically, one on each side of the pitch change axis of the blade, each of these balls being connected to the tie situated on the same side of the pitch change axis as the ball in question by means of a ball eye surrounding the ball in question and separated from the other ball eye only by slight transverse clearance at right angles to the pitch change axis of the blade.

As an alternative to this construction, in which each member connecting a blade to the hub is connected to the two adjacent ties by two identical balls as close to one another as possible, the means for the articulated connection of each of two neighboring ties on one and the same blade comprise a respective one of two main balls disposed on the corresponding connection member in positions radially offset along the pitch change axis of the blade, on which axis each of the main balls is centered, each of these balls being, in this case also, connected to a respective one of the two neighboring ties in question by means of a ball eye surrounding it.

In this variant, in which the two main balls are radially offset along the pitch change axis of each blade in order to restore a certain mounting symmetry and to re-balance the distribution of stresses in the different ties despite the radially offset mounting of two neighboring ties on one and the same blade, it is advantageous for the main ball connecting one end of each tie to the member connecting a blade to the hub to be radially on the outside of the other main ball held on the member connecting the blade to the hub, while the main ball connecting the other end of the tie to the member connecting a neighboring blade to the hub is radially on the inside of the other main ball held on the connection member of the neighboring blade.

In the two configurations comprising, on each member connecting a blade to the hub, two main balls, at least one ball eye held on said connection member by one of its main balls is directly fastened to at least one of the rigid members of the tie articulated on said connection member by the corresponding main ball. However, it is also possible for at least one ball eye, held by one of the corresponding main balls on this member connecting a blade to the hub, to have a connection arm articulated on at least one rigid member of the tie connected to said connection member by the corresponding main ball.

On each of the ties used at least one resilient return member may consist of a return mass composed of an elastically deformable material, and at least one damping means may be constructed in the form of a hydraulic damper, so that each tie may have a structure similar to that of the hydroelastic braces described in the previously mentioned French patents and serving to connect each blade to the hub, or else a structure similar to that of one of the resilient return braces with built-in damping described in French Patent No. 2,063,969 of the Assignee.

In particular, for reasons of simplicity of production, reliability, size, mass, lag and cost, it is advantageous that in the different preferred forms of construction of the rotor head according to the invention each tie should, as indicated in claim 9 of French Patent No. 2,063,969, comprise an elongated central rigid plane plate engaged at least partially between two external rigid plane plates, which are elongated in the same direction and to each of which the central plate is connected by a layer of a viscoelastic material bonded to the two plates connected together by it, in accordance with a known structure in which the viscoelastic material is subjected to shearing stresses by relative longitudinal displacements of the central plate and of the outer plates, the central plate being in addition provided with an end piece in the form of a pivot eye extending on one side, in the direction of elongation of the plates, beyond the outer plates, while the latter have on the other side, in the direction of the elongation of the plates and beyond the central plate, a bolted connection to the end of one of the arms of the rigid V-shaped member articulating the main ball on the member connecting a blade to the hub.

In addition, each tie is advantageously mounted between two blades in such a manner that the plane of the plates is substantially parallel to the lag axes of the two blades, a feature which, in conjunction with the low mass of such ties when their rigid plates are of light alloy, means that the effects of the centrifugal forces to which such ties are subjected are negligible.

Furthermore, in order to limit in an absolute manner the lag deflections of each blade, in one direction during the starting-up phases of the rotor and in the other direction during the rotation braking phases of the rotor, each member connecting a blade to the hub advantageously supports, radially on the inside of each main ball which it retains, two feet projecting laterall relative to the connection member and extending in the one caseon one side and in the other case on the other side of the pitch change axis of the blade, each of these two lateral feet having a stop surface facing the hub and intended to come to bear against one of two lag stop surfaces which are directed towards the outside of the hub and towards the end of the corresponding blade and each of which is provided on a respective one of two projecting bosses on the outer radial face of the hub and laterally on each side of the corresponding connection member and of the means articulating the latter on the hub. In this way the lag deflections of the blade on the starting and on the stopping of the rotation of the rotor are limited by the stop surface of a lateral foot which bears directly against a lag stop surface of the hub.

In addition, one of the two lateral feet of each connection member is advantageously extended laterally beyond the corresponding stop surface and is shaped as a lever controlling the pitch of the corresponding blade, so that this pitch control lever and one of the direct lag stops carried by the blade are made in the form of a single piece.

In order to facilitate the production of each member connecting a blade to the hub and also the production of the articulation means of this connection member and their cooperation, on the one hand, with said connection member and, on the other hand, with the hub, it is advantageous in the different forms of construction of a rotor head according to the invention for each connection member to be a radial clevis comprising an upper branch and a lower branch, which are disposed facing one another and are spaced apart in the direction of the lag axis of the corresponding blade and the outer radial ends of which are integral with the blade root, which is then forked, or retain between them the root of the corresponding blade, while their inner radial ends are fastened to an inner radial frame of the means effecting the articulation on the hub, which means also have an outer radial frame fixed on a part of the hub and disposed between the two branches of the clevis, each of the corresponding main balls being retained and substantially housed between the two branches of the clevis, between the outer radial ends of said branches and the outer radial frame, which is also disposed between them.

In this way it is possible for each main ball to be retained directly about an axis parallel to the lag axis of the corresponding blade and between the two branches of the corresponding clevis. In particular, each main ball may, on the one hand, be housed between two bosses projecting towards one another on the face of a respective one of the branches of the clevis which faces the other branch and, on the other hand, be retained by a diametrical pin whose axis is parallel to the lag axis of the blade and which passes through the ball and the bosses and is fixed on the two branches of the clevis.

However, in the embodiments in which two main balls are retained on each clevis connecting a blade to the hub, it is also possible for each main ball to be housed in a part mounted as a brace between the two branches of the clevis and having at least one ball socket which opens laterally towards one side of the clevis and towards the hub and in which a main ball is retained about a diametrical axis at right angles to the lag axis of the corresponding blade and substantially at right angles to the longitudinal axis of the tie which this ball connects to the clevis.

In this last-mentioned case, it is possible to use a single part mounted as a brace and having two ball sockets each receiving a single ball, but it is likewise possible to mount two separate parts between the two branches of the clevis, each part being mounted as a brace between these two branches, while each of the two main balls is received and retained in a respective one of these two parts forming braces.

Furthermore, when the member connecting a blade to the hub is a clevis, in order to facilitate its production as two separate branches joined together, it is advantageous for the two lateral feet provided with the stop surfaces, and where applicable with the pitch control lever, to be made as a single piece, which is mounted as a brace between the clevis branches, to which the brace thus formed is fixed in a radial position between the corresponding main ball or balls and that part of the hub to which the outer radial frame of the corresponding articulation means is fixed.

Rotor heads according to the invention, as defined above, may be produced by using hubs of different types the use of which has recently been proposed for equipping modern helicopters.

In particular, the rotor head may have a hub of the type comprising a rigid peripheral rim of substantially circular or substantially polygonal shape, the number of sides and the number of apices being equal to the number of blades and the side and/or apices being rounded and the rigid peripheral rim being fixed for rotation with a rotor-mast unit about the axis of rotation of the rotor, while the articulation means of each member connecting a blade to the hub, preferably a single laminated spherical thrust bearing, are substantially housed inside the rim and connect the corresponding connection member, preferably a clevis, to a part of the hub rim.

The hub rim may be rigidly connected to a substantially cylindrical, and optionally tubular, central member by which the hub is fixed for rotation with the rotor-mast unit by means of substantially radial spokes, which delimit, between the rim and the central member of the hub, sockets in each of which may be mounted the means articulating to the hub the member connecting a blade to said hub.

However, the rotor head according to the invention advantageously comprises an integrated tubular hub-mast unit having the rim in its top portion and being provided for each blade with at least one opening formed in the hub-mast unit in a position adjacent the rim, while a part of the corresponding connection member passes through said opening in order to connect the blade, outside the hub-mast unit, to the corresponding articulation means housed inside the hub-mast unit.

In order to reduce the overall aerodynamic drag of the rotor head, particularly at the hub, it is then advantageous for the rotor head to be provided with a top curved fairing covering the upper part of the hub and having cavities for the passage of the members connecting the blades to the hub, this fairing preferably being mounted floating on the ring of ties and being connected by silentblocs at its periphery to arms connecting certain ties to the corresponding main balls.

However, it is likewise possible for the rotor head according to the invention to comprise a hub of the type having a substantially radial plate of substantially circular or substantially polygonal shape, which has sides and/or apices which are likewise rounded and which is fixed for rotation with a rotor-mast unit about the axis of rotation of the rotor, the plate having formed in it a number of cavities equal to the number of blades, while the articulation means of the member connecting a blade to the hub are then at least partially housed in the corresponding cavity and bear against the outer radial side of said cavity, and are connected to the blade by a top part and a bottom part of the connection member, said top and bottom parts extending respectively above and below the plate.

According to the invention it is also possible for the rotor head to comprise a hub of the type having two substantially radial plates fixed for rotation with a rotor-mast unit about the axis of rotation of the rotor and spaced apart in the direction of the axis of rotation of the rotor, so that for each blade they have two outer radial plate parts facing one another, between which are retained the articulation means of the corresponding member making the connection to the hub, as well as at least an inner radial part of this connection member.

In all of these known types of hub the invention will advantageously be applied if the member connecting each blade to the hub is a double radial clevis or a radial sleeve shaped as a clevis at each of its radial ends, and has lateral openings to permit the passage of the arms connecting the main balls to the interblade ties, feet provided with the lag stop surfaces and a pitch control lever being fixed on said sleeve, while the clevis or the sleeve retains, at its outer radial end, the root of the corresponding blade and the clevis or the sleeve is retained on the hub by its inner radial end. Moreover, at the same time the means articulating each connection member on the hub advantageously consist of a single laminated spherical articulation, likewise forming a thrust bearing, the inner radial frame of which articulation is retained between the inner radial ends of the two branches of the radial clevis or in the clevis of the inner radial end of the connection sleeve, while the outer radial frame of the laminated spherical thrust bearing is fixed against the hub rim or against the inner radial edge of the cavity in the hub plate, or else retained by at least one pin between two mutually facing parts of the two plates of the hub, for example two superimposed radial arms of the plates, depending on whether the hub is a rim hub, a hub having a radial plate provided with cells or cavities, or finally a hub having two superimposed radial plates.

BRIEF DESCRIPTION OF THE DRAWINGS

The invention will be better understood and other advantages and characteristics of the invention will emerge from the non-limitative description given below of various examples of embodiment which are described with reference to the accompanying drawings, in which:

FIG. 1 is a partial plan view, partly in section through the plane of rotation of the blades, of a rotor head having five blades and of two of the five double clevises connecting the blades to the hub, as well as of the resilient return interblade ties with built-in damping which interconnect the clevises.

FIG. 2 is a view in section on the line II—II in FIG. 1 and shows a double clevis connecting a blade to the hub, as well as its connection and its articulation to the latter.

Figure 4:
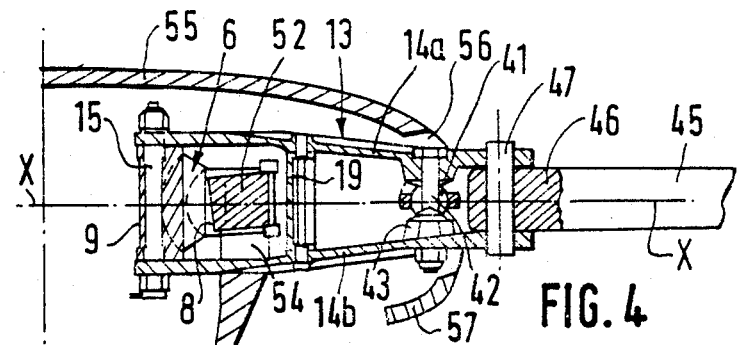
FIG. 4 is a schematic view in half-section through a vertical, substantially radial plane, on the line IV—IV in FIG. 3.

DESCRIPTION OF THE PREFERRED EMBODIMENTS.

FIG. 1 shows part of a rotor head which has five blades and whose rigid hub 1 comprises essentially a rigid rim 2 connected by five substantially radial spokes 3 to a central cylindrical, tubular body 4 which is fixed for rotation with a rotor-mast unit (not shown) about the axis A of rotation of the rotor.

The rim 2, whose cross-section (through a vertical radial plane) is substantially square (see FIG. 2), has in plan substantially the shape of a regular pentagon whose sides and apices are slightly rounded and convex, that is to say curved radially outwards relative to the axis A, and the five spokes 3 are connected to the rim 2 in the zones situated substantially in the middle of the five sides of the pentagon. The spokes 3 thus delimit between them and with the central body 4 and the rim 2 five cavities 5, in each of which the means articulating a blade on the hub 1 can be substantially housed, these articulation means bearing against the inner radial face of the rim 2 at the rounded apex of the latter which delimits the corresponding cavity.

The hub 1 may be entirely of metal or be made at least partially of composite materials, in the latter case preferably with a reinforcing strap or belt embedded in the rim 2.

The means articulating each blade on the hub 1 consist of a single laminated spherical thrust bearing articulation 6 of a well known type, comprising a central part 7 composed of an alternating stack of rigid cups, generally of metal, and layers of elastomer in the form of spherical domes, and bonded on the one hand against the convex face of the spherical dome in an inner radial position on the outer radial frame 8 of the thrust bearing 6, and on the other hand against the concave face of the spherical dome in an outer radial position on the inner radial frame 9 of said laminated spherical thrust bearing 6.

As also shown in FIG. 2, the outer frame 8 is shaped as a bow comprising an upper radial arm 8a and a lower radial arm 8b, with the aid of which arms the outer frame 8 straddles the rim 2. In addition, the outer frame 8 has a central, substantially radial blind bore which leads out at its outer radial face between the arms 8a and 8b and by which the outer frame 8 is positioned with appropriate inclination relative to the rim 2 by means of a cylindrical stud 10 inserted into said blind bore and projecting radially inwards on the inner radial face of the rim 2. The outer bow-shaped frame 8 is retained on the rim 2 with the aid of a strap 11 which is applied against the outer radial face of the rim 2 and whose top and bottom ends project respectively above the top face and below the bottom face of the rim 2 and are rigidly connected respectively to the top arm 8a and the bottom arm 8b of the frame 8 by top and bottom threaded bolts 12a and 12b respectively, whose heads are held against the strap 11 and whose threaded stems are screwed into the arms 8a and 8b respectively.

The inner frame 9 of the laminated spherical thrust bearing 6 is mounted as a rigid brace between the inner radial ends of a top plate 14a and a bottom plate 14b, which plates are joined together to form the respective top and bottom branches of a double radial clevis 13 making the connection to the corresponding blade. The inner frame 9 is held between the branches 14a and 14b by two threaded bolts 15 passing through coincident holes formed in the frame 9 and in the branches 14a and 14b on axes parallel to the axis of rotation A of the rotor and symmetrically one on each side of the longitudinal pitch change axis X—X of the corresponding blade, as well as by nuts 16 screwed onto the bolts 15. The two branches 14a and 14b are disposed symmetrically to one another in relation to the transverse plane at right angles to the axis of rotation A of the rotor and passing through the pitch change axis X—X of the corresponding blade; these branches 14a and 14b each have the appearance of a radially elongated rigid plate having in plan substantially the shape of an isosceles trapezium of very great height. As shown in FIG. 2, the two plates 14a and 14b are brought substantially closer to one another in their middle portion and have outer radial ends 17a and 17b respectively which are parallel and face one another, with sufficient spacing between them in the vertical direction, parallel to the axis of rotation A of the rotor, to receive and retain between them the root of the corresponding blade with the aid of two pins (not shown), each of which is held in two coincident holes 18 formed in the flat ends 17a and 17b on axes parallel to the axis A and symmetrically one on each side of the corresponding pitch change axis X—X.

The radial clevis 13 is stiffened by another brace 19 mounted and held rigidly by two bolts 20 between the branches 14a and 14b connected together by said brace 19, which is disposed radially on the outside of the rim 2, and the two bolts 20 likewise have their axes parallel to the axis of rotation A of the rotor and are symmetrical, one on each side of the pitch change axis X—X. On one side of said axis X—X the brace 19 is extended by a lateral foot 21 extending in a direction inclined laterally towards the outside of the clevs 13 and radially towards the rim 2, the free end of which foot is provided, towards the rim 2, with a stop surface 22 substantially at right angles to the axis X—X. On the other side of the axis X—X the brace 19 is also extended by a lateral foot 23, which likewise extends in a direction inclined laterally towards the outside of the clevis 13 and radially towards the rim 2 and which likewise has, towards the rim 2, a stop surface 24 substantially at right angles to the axis X—X. However, the foot 23 is longer than the foot 21, and its portion extending beyond the stop surface 24 is shaped as a pitch control lever, with an end clevis 25 in which the top end of a pitch control connecting rod 26 is held by a ball joint.

For each blade the rim 2 has on its outer radial face two bosses projecting outwards and situated laterally one on each side of the corresponding clevis 13, each of these bosses carrying one of two lag stop surfaces 27 and 28, which face towards the outside and towards the end of the corresponding blade and are situated respectively opposite the stop surfaces 22 and 24 on the brace 19. In addition, the lag stop surfaces 27 and 28 are slightly curved surfaces having a double curvature; they have a certain convexity in a vertical plane parallel to that passing through the corresponding axis X—X, and another slight convexity in the horizontal plane passing through the same axis X—X, so that these lag stop surfaces . 27 and 28 permit a certain pitch and flapping movement while one or the other may be in contact respectively with the stop surface 22 or 24, on the one hand when the rotation of the rotor is started and on the other hand when this rotation is stopped, because of the angular lag movements which are then made by the corresponding blade about its lag axis, which is an axis parallel to the axis A and passing through the center C of the laminated spherical thrust bearing 6, that is to say through the geometrical center of the spherical dome-shaped central portion 7 of said thrust bearing 6, this center C being in this example situated geometrically on the pitch change axis X—X and in the rim 2, on its inner radial face side. It should be noted that the flapping axis of the blade is likewise an axis at right angles to the pitch axis X—X of the blade and passes through the center C of the spherical thrust bearing, but this flapping axis is situated in the plane of rotation of the rotor or lag plane of the blades. Because of the articulation, on the rim 2, of each clevis 13 connecting a blade to the hub with the aid of a laminated spherical thrust bearing 6, the angular flapping and lag oscillations of each blade, and also the controlled changes of the angular orientation of each blade about its pitch change axis through appropriate action on the corresponding pitch control lever 23, are in fact permitted by the shear deformations of the elastomer layers of the laminated spherical dome-shaped part 7 of the corresponding laminated thrust bearing 6, which transmits in compression in the rim 2 of the hub 1 the centrifugal stresses and shear stresses originating from the blade and transmitted to it by the plates 14a and 14b of the clevis 13.

In a rotor head of this kind the stop surfaces 22, 24, 27 and 28 define a system of clean lag stops making it possible to limit in an absolute manner the lag movements of the clevises 13 during the rotor starting phases in one direction and the rotor braking phases in the other direction, through the direct bearing of the clevises 13 against the hub rim 2.

The rotor head is also equipped with five resilient-return ties 29 with built-in damping (only three of them being visible in FIG. 1), which each connect the clevises 13 of two neighboring blades of the rotor and which serve as blade lag frequency adaptors in an interblade connection device mounted in a ring around the hub 1. Each tie 29 is an elongated member of a well known structure, effecting resilient longitudinal return with powerful internal damping due to plates of a viscoelastic material, which has high deformation remanence, interposed between metal plates.

To be more precise, in this example each tie 29 comprises an alternating stack of three elongated, substantially rectangular plates of light alloy and two likewise substantially rectangular, elongated layers of viscoelastic elastomer, so that in the central position between the two outer plates 31 elongated in the same direction, which is the longitudinal direction of the tie 29, the elongated plate 30 is connected to each of them by a respective one of the two elastomer layers 32, each of which is bonded by vulcanization to the inner face of the corresponding outer plate 31 and to the oppositely situated face of the central plate 30. These plates 30 and 31 and these layers 32 have a relatively slight thickness in comparison with their length and width, so that the tie 29 has the shape of a relatively flat member in which the center planes of the plates 30 and 31 are parallel to one another. The central plate 30 decreases in thickness from one end, corresponding to a shorter side, towards its opposite shorter end side, while each of the two outer plates 31 decreases in thickness in the opposite direction, so that each elastomer layer 32 has a substantially constant thickness. At its thicken end the central plate 30 is extended beyond the thinner ends of the outer plates 31, to form an end portion 33 which is provided with an eye whose axis is in the center plane of the central plate 30 and at right angles to the longitudinal axis of the tie 29, while at their thicker end each of the outer plates 31 is extended beyond the thin end of the central plate 30 by one of the two parallel, spaced branches of a connection clevis 34, coinciding holes being formed in said branches. The end 33, which is provided with an eye, and the clevis 34 constitute the two longitudinal ends by which each tie 29 is connected to two neighboring clevises 13 by means of connection members 35, each of which is in the form of a V-shaped bent lever.

Each V-shaped lever 35 is rigid and comprises two arms 36 and 37 connected to one another at the base of the lever 35, which is shaped as a ball joint eye 38, and the free end 39 of the arm 36 has holes formed in it to coincide with those formed in the clevis 34, so as to enable them to be fastened together by means of at least two bolts, while the free end of the other arm 37 is in the form of a clevis 40 for pivoting about an axis parallel to the axis of the eye 38. Each lever 35 is mounted on a clevis 13 in such a manner that its arms 36 and 37 are directed towards the hub 1 and one on each side of the corresponding pitch change axis X—X, that is to say in such a manner that each V-shaped lever opens towards the hub 1 and its ball joint eye 38, directed towards the blade, surrounds a ball 41 held in the clevis 13 by a diametrical pin 42 whose axis is parallel to the axes of the bolts 15 and at right angles to the pitch change axis X—X, which it intersects at the center of the ball 41, the pin 42 being retained by its head on the top branch 14a and, on the bottom branch 14b, by a nut screwed onto the threaded end of its stem, while the ball 41 is positioned between two bosses 43 through which the pin 42 passes and which project towards one another, one from the lower face of the top branch 14a and the other from the upper face of the bottom branch 14b in order to secure the position of the center of the ball 41 on the pitch change axis X—X of the corresponding blade. The end 33, provided with an eye, of a tie 29 is articulated by a small ball 44 of laminated elastomer in the clevis 40 of the arm 37 of the V-shaped lever 35. Thus, each clevis 13 connecting a blade to the hub 1 is connected by a single main central ball 41, centered on the pitch change axis of the blade in question, to the ring of interblade ties 29, being for this purpose connected to two neighboring ties of this ring by a corresponding V-shaped lever 35, of which one arm 37 of the two arms 36 and 37 is connected by a small secondary ball, such as 44, to the adjacent end of that one of the two ties 29 which is situated on the same side of the pitch change axis X—X of the blade as the corresponding arm 37 of the lever 35. The axis of the eye 33 and of the clevis 40 is parallel to the axes of the main balls 41, so as to ensure the overall stability of the mounting of the ties 29 in compression, these ties 29 being mounted in such a manner that, at rest, the center planes of their plates will be substantially vertical and parallel to the axis A and that the center of the secondary articulation ball 44 of one of the ends of each tie 29 and the centers of the two main balls 41 connected together by said tie 29 will be in alignment on the longitudinal axis of the tie 29. On the other hand, during operation the small secondary balls 44 are intended to compensate for misalignment.

This mounting of each tie 29 between two clevises 13 connecting two neighboring blades to the hub has two effects on the operation of the rotor head: the blades can assume a position of equilibrium in lag, as in a rotor head on which they would be freely articulated, the in-phase oscillations of the five blades being free, with the consequence that the natural transmission modes are displaced and all damping is eliminated for this type of oscillations. Thus, each tie 29 is stressed only by out-of-phase or differential angular lag movements of the blades relative to one another, with the introduction of a powerful resilient return and a damping into these out-of-phase angular lag movements, which are completely disconnected from the angular pitch and flapping movements, so that, in particular, the stresses on the interblade ties 29 give rise to no annular pitch stresses on the clevises 13 and on the pitch control associated with them.

During flight, under stabilized conditions, the known equality between the cyclic pitch angle and the flapping of a blade, with a phase displacement of 90°, has the consequence that the main balls 41 connecting the ties 29 to the clevises 13 of the blades undergo only cyclic movements of slight amplitude, so that the plane described by the ties 29 in their rotation with the blades about the axis A remains substantially parallel to the plane described by the ends of the blades, if the small movements due to the higher harmonics of the vibratory conditions are not taken into account. With regard to the small secondary balls articulating the ties 29 on the arms of the connection levers 35, these undergo only small movements due to the higher flapping harmonics or to the movements of the blades when the rotor is stopped. It will also be noted that in this rotor head the only travel imposed on the ties 29 under static conditions originates from the small variations of the distance between the axis A of the hub 1 and each tie 29, which are due to the lag and the conicity of the rotor. Considered on the axis of the ties 29, static travel of this kind would amount to about 2 millimeters in the case of maximum flight, but in a rotor head of a construction of this kind it is substantially eliminated by the crushing of the compressed elastomer layers of the laminated spherical thrust bearings 6 and by the radial deformation of the rim 2 of the hub 1 through the action of cetrifugal force. A preadjustment favorable to flight under full power is thus obtained naturally. In addition, it is easy to adjust the stiffness of the ties 29 according to requirements by adaptation of the mass of viscoelastic material of the ties 29; damping will be adequately ensured without exceeding the capabilities of known viscoelastic elastomers. It is thus possible to obtain a rotor head which has no coupling, and which has good ground resonance and air resonance stability.

When the rotor is started up and when it is stopped, the lag stops 22, 24, 27 and 28 are loaded, if at all, only during a few revolutions and with a low stress level, while permitting pitch and flapping movements while the stop surfaces 22 are in contact with the lag stop surfaces 27, or the stop surfaces 24 are in contact with the stop surfaces 28. It may be noted that such a clean-acting lag stop device cooperates advantageously with low flapping stops of the type comprising a reciprocal ring mounted around the rotor mast supporting the hub 1. Furthermore, because of the interblade connections made by the ties 29, this rotor head eliminates the risk of unbalance or shocks against the flapping or lag stops on starting up, particularly when the helicopter is placed on a sloping surface.

Figure 3:
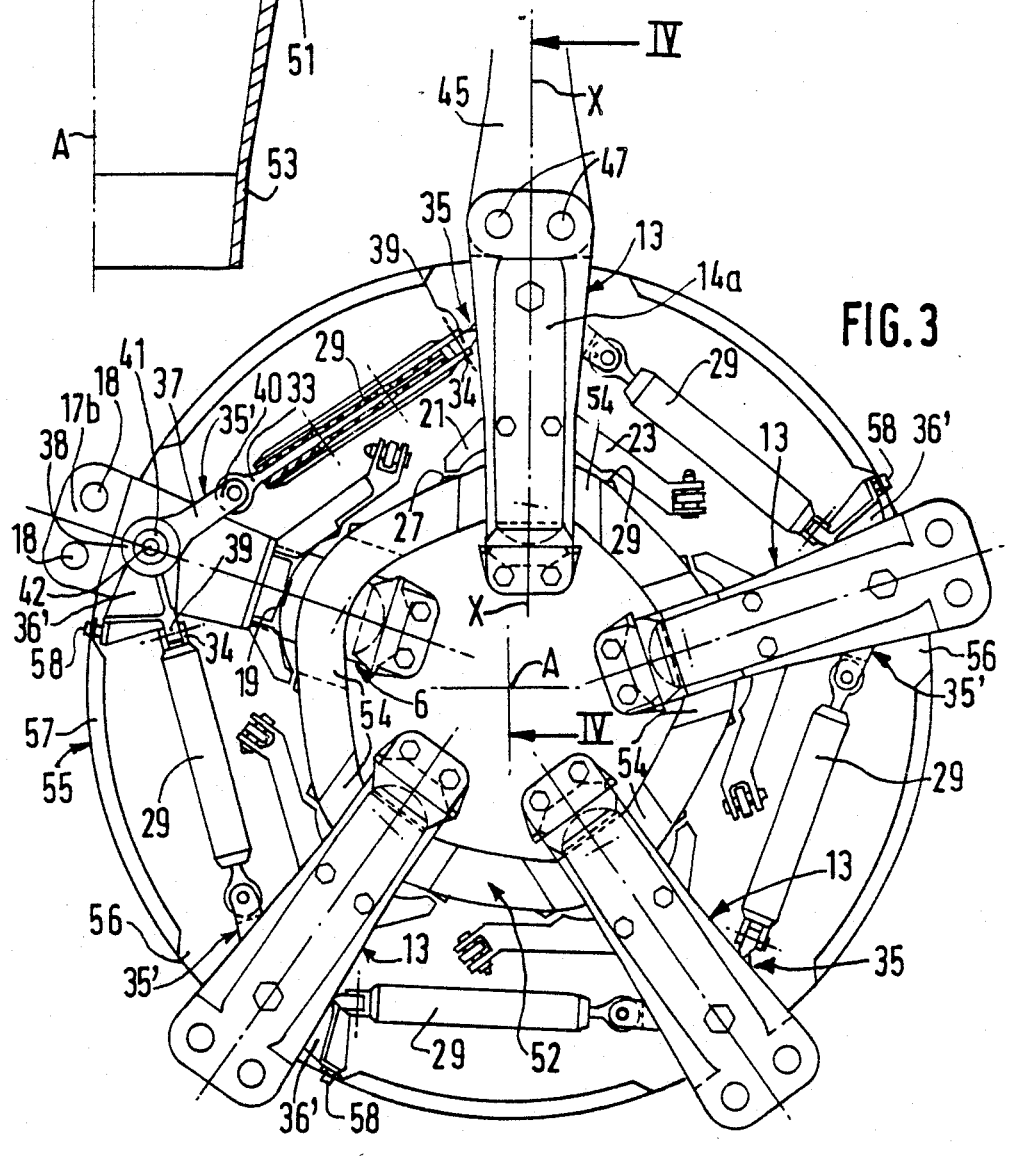
FIG. 3 is a similar view to FIG. 1, showing a second example of a five-bladed rotor head, in which each of the blades is connected by a double clevis, similar to that shown in FIG. 2, to the rim of an integrated tubular hub-mast unit of the rotor.

FIG. 3 shows a second example of a five-bladed rotor head, of which each blade 45 is rigidly retained by its root 46 with the aid of two pins 47 (one of which may be removable in order to enable the blade 45 to be folded back by pivoting about the axis of the other pin 47) between the outer radial ends of the top branch 14a and bottom branch 14b of a double radial clevis 13, which has the same construction and is mounted under the same conditions as in the example illustrated in FIGS. 1 and 2. Thus, each clevis 13 connects a blade 45 to the hub 51 with the aid of a laminated spherical thrust bearing 6 of the kind described in the first example; the outer and inner radial frames 8 and 9 respectively of said bearing are respectively retained on the rim 52 of the hub 51 and disposed as a brace between the branches 14a and 14b of the clevis 13 by bolts 15, under the same conditions as in the first example. Similarly, the clevis 13 has a second brace 19 carrying the lateral feet 21 and 23 which are provided with lag stop surfaces and of which one 23 is shaped as a pitch control lever. Finally, each clevis 13 is connected, in the same way as in the first example, to two neighboring ties 29 of an interblade connection device comprising five resilient-return ties with built-in damping, which are identical to the ties of the first example, by means of a single main ball 41 centered on the pitch change axis X—X of the blade 45 and held between the two bosses 43 inside the branches 14a and 14b of the clevis 13 by a diametrical pin 42 whose axis is vertical. The rim 52 of the hub likewise has the same shape in plan and the same lag stops 27 and 28 as the rim 2 in the first example.

However, in this second example the hub consists of the top part of an integrated tubular hub-mast unit 51, the bottom part 53 of which is directly driven rotationally about the axis A of the rotor by the main transmission box of the helicopter, and which may be constructed in accordance with the information given in the Assignee's French Patent Nos. 2,584,995, 2,584,996 and 2,584,997, the descriptions of which are incorporated in the present specification by way of reference.

To be more precise, in this second example the rim 52 constitutes the thickened top end of the integrated tubular hub-mast unit 52 made of composite materials and constructed in accordance with French Patent No. 2,584,996, and therefore such that the hub-mast unit 51 has formed in it a number of apertures 54 equal to the number of blades and regularly distributed in the circumferential direction over the periphery of the hub-mast unit 51, in positions adjacent the rim 52. The latter is in the form of a reinforcing ring intended to take the centrifugal forces introduced into the hubmast unit 51 by the laminated spherical thrust bearings 6, which are substantially housed inside the hub-mast unit 51 and bear against its inner face at the rim 52, being connected to the clevises 13, the bottom branch 14*b* of each of which passes through the corresponding opening 54 in the hub-mast unit 51, as illustrated in the vertical half-section in FIG. 4.

In order to reduce the overall aerodynamic drag of the rotor head, the hub-mast unit 51 is covered with a curved top fairing 55, which in its peripheral part is provided with a number of openings 56 equal to the number of blades 45; these openings are so disposed that each of them permits the passage of a clevis 13 with sufficient clearance not to interfere with said clevis 13 in its angular flapping, lag and pitch movements. The bottom part 57 of the fairing, curved back towards the hub-mast unit 1, has an inner radial edge sufficient by distant from the hub-mast unit 51 not to interfere with the pitch control connecting rods connected to the levers 23, or with the low flap stop device (not shown).

The fairing 55 may be rigidly fastened on the hubmast unit 51 with the aid of a cap (not shown) fixed on the rim 52 between the clevises 13 and provided with a number of radial openings equal to the number of blades; these openings are regularly distributed in the circumferential direction on the cap, and each of them is axially spaced from an opening 54 in the hub-mast unit 51 by the rim 52, in order to enable the top branch 14*a* of the clevis 13, whose bottom branch 14*b* passes through the corresponding opening 54, to pass through it.

However, in order to limit the size of the openings 56 in the fairing 55 and to dispense with the support cap for said fairing, the latter is advantageously mounted floating on the ring of ties 29, making use of the main balls 41 as support isolating the fairing 55 from the pitch movements of the clevises 13, but driving it in flapping movements and in the collective lag displacements. As in the first example, each main central ball 41 is connected to the two corresponding neighboring ties 29 by a connection member in the form of a V-shaped lever, of which a clevis 40 at the end of one arm 37 is connected by a secondary ball to the eye 33 on the adjacent end of one of the two ties 29, while the end part 39 of the other arm is rigidly connected by a bolted joint to the clevis 34 on the adjacent end of the other tie 29. Nevertheless, in order to achieve the floating mounting of the fairing 55 on the rotor head, only two V-shaped levers not adjoining one another are levers 35 identical to those in the first example, while the other three V-shaped levers 35' have an arm 36' carrying at its end a connector 39 and having a substantially trapezoidal shape, widening from the ball eye 38 (provided at the base of each V-shaped lever 35 or 35' to surround the corresponding main ball 41) towards the end connector 39 and radially outwards. At its apex directed radially outwards, said arm 36' carries a small rubber block, in the form of a silent-bloc 58, on which the fairing 55 is fixed at the edge of the corresponding cutout 56.

The three silentblocs 58, which attach the periphery of the fairing 55 to the three V-shaped levers 35', isolate the fairing 55 from the differential lag movements of the blades, and the size of the cutouts 56 can be reduced to the minimum necessary to allow the passage of the clevises 13, their differential lag movements, and the small movements due to the higher flapping-harmonics. The rocking of the floating fairing 55, caused by the flapping of the blades 45, is of an amplitude substantially equal to half that of the flapping.

In addition to the advantages already mentioned in the case of the first example, a construction of this kind is particularly advantageous because of the great compactness of the integrated hub-mast unit, and because the small radius of attachment of the blades 45 (that is to say the short distance separating the pins 47 from the axis of rotation A of the rotor) permits a compact fairing, so that the overall aerodynamic lag of the rotor head is reduced. It will be noted furthermore that, in order to enable the blades 45 to be folded back, only the bottom part 57 of the fairing 55 has to be eliminated or cut out appropriately.

It is clear that instead of an integrated tubular hub-mast unit having one radial opening per blade and a rim at its top end, it is possible to use an integrated tubular hub-mast unit having one pair of radial openings per blade, these openings being situated one on each side of a reinforcing belt. The top branch of the corresponding connection clevis passes through one of them, and the bottom branch of the same clevis passes through the other, as described in French Patent No. 2,584,995. It is also possible to use an integrated tubular hub-mast unit similar to that described above with reference to FIGS. 3 and 4, but extended axially beyond the rim 52 by an end portion having, for each blade, a cutout opening into the free edge of said portion and corresponding axially to the corresponding radial aperture in the hub-mast unit, so that the bottom and top branches of the corresponding connection clevis pass respectively through the radial aperture and the corresponding cutout in the hub-mast unit.

When the tubular hub-mast unit has a top end portion of this kind, provided with cutouts, this portion may in addition, as also mentioned in French Patent No. 2,584,996, be covered with a cap fastened to the hub and also having for each blade a cutout opening into its edge facing the rim, so that each cutout in the cap forms, together with a cutout in the end portion of the hub-mast unit, a top radial opening through which passes the top branch of the corresponding connection clevis, the bottom branch of which passes through the corresponding radial opening formed under the rim in the hub-mast unit.

Figure 5:
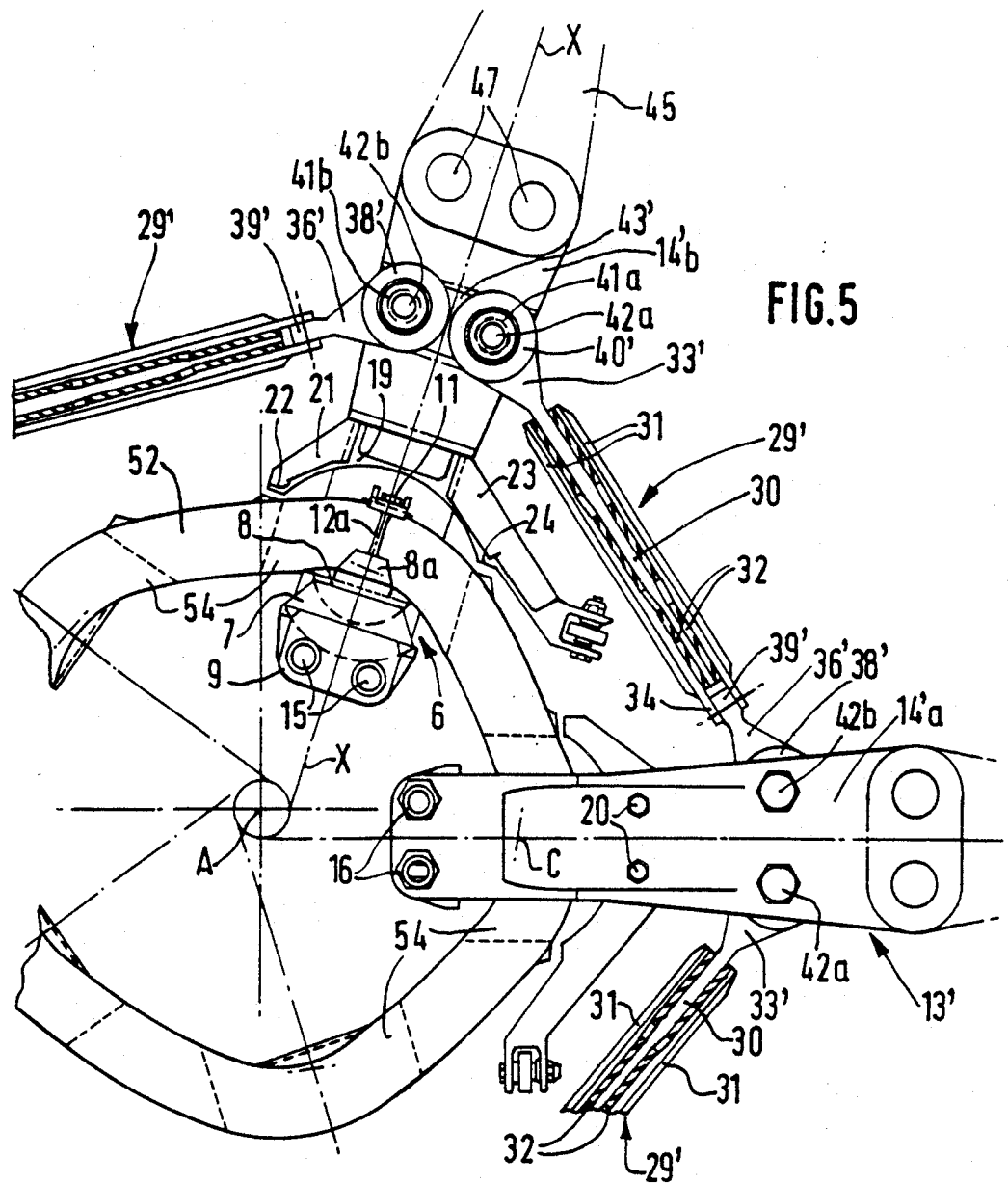
FIG. 5 is a similar view to FIG. 1, showing a third example of a five-bladed rotor head.

The five-bladed rotor head, of which part is illustrated in FIG. 5, comprises an integrated tubular hub-mast unit identical to that shown in FIGS. 3 and 4, with one radial opening 54 per blade 45 and with a rim 52 at its top end, but the hub could be the one shown in FIG. 1, with a rim connected by spokes to a central hub body.

Each blade 45 is connected to the rim 52 by a connection clevis 13', which differs structurally from the clevis 13 of the preceding examples only in that between its top and bottom branches 14′a, 14′b it holds two mainballs 41a, 41b disposed symmetrically one on each side of and in immediate proximity to the pitch change axis X—X of the blade 45. Each main ball 41a or 41b is held by a diametrical pin 42a or 42b fixed to the branches 14′a and 14′b, the axis of this pin being parallel to the axes of the pins 47 connecting the root of the blade 45 to the clevis 13′ and lying in a plane at right angles to the axis X—X, in a radial position on the inside of the pins 47 but on the outside of the brace 19 mounted between the branches 14′a and 14′b and just radially on the outside of the rim 52; said brace carries lateral feet 21 and 23 provided with lag stop surfaces 22 and 24, the second of said feet forming the pitch control lever. As in the preceding examples, each clevis 13′ is retained and articulated on the rim 52 by a laminated spherical thrust bearing 6 the structure and mounting of which on the rim 52 are in every way identical to the description given in this regard with reference to FIGS. 1 and 2, so that the same references are used in FIG. 5 to designate the same components, without it being necessary to describe these components again.

In this example also the interblade connection device comprises five resilient-return ties 29′ with built-in damping, which are mounted in a ring around the rim 52 and each of which is composed of the same alternating stack of a central metal plate 30 and two outer metal plates 31, together with two viscoelastic elastomer layers 32, as in the first two examples. In addition, one longitudinal end of each tie 29′ consists of a bolted double connection clevis 34, the two branches of which are formed by the extensions of the two outer plates 31 beyond the inner plate 30. On the other hand, the eyed end piece 33′ fixed to the central plate 30 beyond the outer plates 31, and forming the other longitudinal end of the tie 29′ is an end piece whose eye 40′ has its axis at right angles to the center planes of the plates 30 and 31 and to the axis of the clevis 34; said end piece is mounted directly around the main ball 41a situated on the same side of the pitch change axis X—X of a blade 45 as the tie 29′ connected to said blade on that side of the axis X—X and associated with said end piece 33′. The clevis 34 of the other end of the tie 29′ is connected to the neighboring blade by an arm 36′, of which one end is in the form of a ball eye 38′ directly surrounding the other main ball 41b of said other blade. The other end of the connection arm 36′ is in the form of a small sleeve 39′, the end of which is engaged inside the two branches of the double clevis 34 and is fixed to the latter by two bolts (not shown). The dimensions of the main balls 41a and 41b and of each eye 38′ or 40′ are such that the eye 40′ is practically externally tangent to the eye 38′ and is separated from the latter only by slight transversal clearance in the direction at right angles to the axis X—X.

The essential difference between this embodiment and the two preceding examples is therefore that each clevis 13′ connecting a blade 45 to the hub is connected to each of the two ties 29′ adjacent to it by a respective one of two identical main balls 41a and 41b held in the clevis 13′ symmetrically one on each side of the pitch change axis X—X of the corresponding blade, but as close as possible to one another.

In comparison with the preceding examples, this configuration introduces a collective blade pitch effect on the deformation of the ties 29′ in the absence of a differential lag of the blades, but the arrangement of the main balls 41a and 41b as close as possible limits this "static" deformation at extreme pitches to a low value, of the order of 1.5 millimeter. On the other hand, maintenance operations are facilitated, because each tie 29′ can be individually removed and replaced without it being necessary to detach the two neighboring ties 29′ from the corresponding clevises 13′.

Finally, in order to ensure that the main balls 41a and 41b will be retained in each clevis 13′ in such a manner that their center will be in the plane of rotation of the rotor (a plane at right angles to the axis of rotation A of the rotor and passing through the pitch change axis X—X of the blade), these main balls are disposed side by side between two internal bosses similar to the bosses 43 in FIG. 2, but extending transversely over the entire width of the branches 14′a and 14′b of the clevis 13′. A bottom boss 43′ of this kind is shown schematically in FIG. 5.

Figure 6:
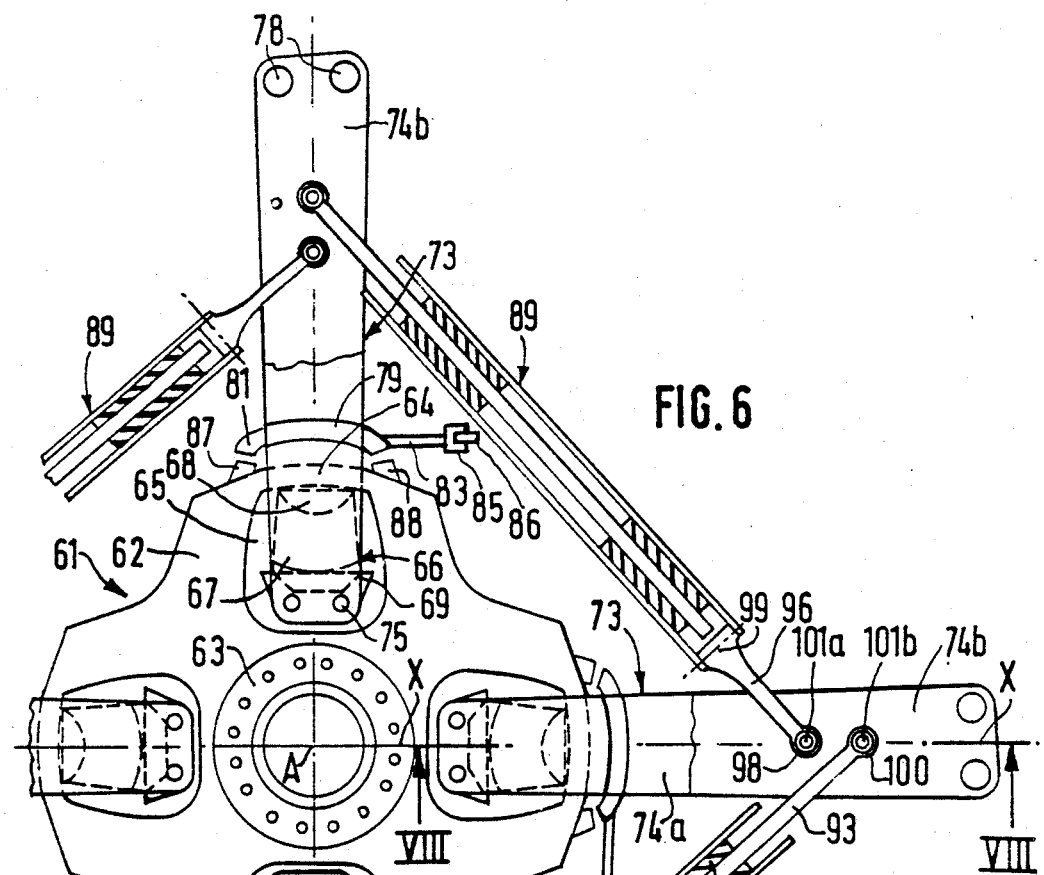
FIG. 6 is a schematic view, partly in plan and partly in section in the plane of rotation of the blades, of a fourth example of a rotor head having four blades and a hub comprising a single radial plate provided with cells or cavities for the connection of the blades to the hub.
Figure 8:
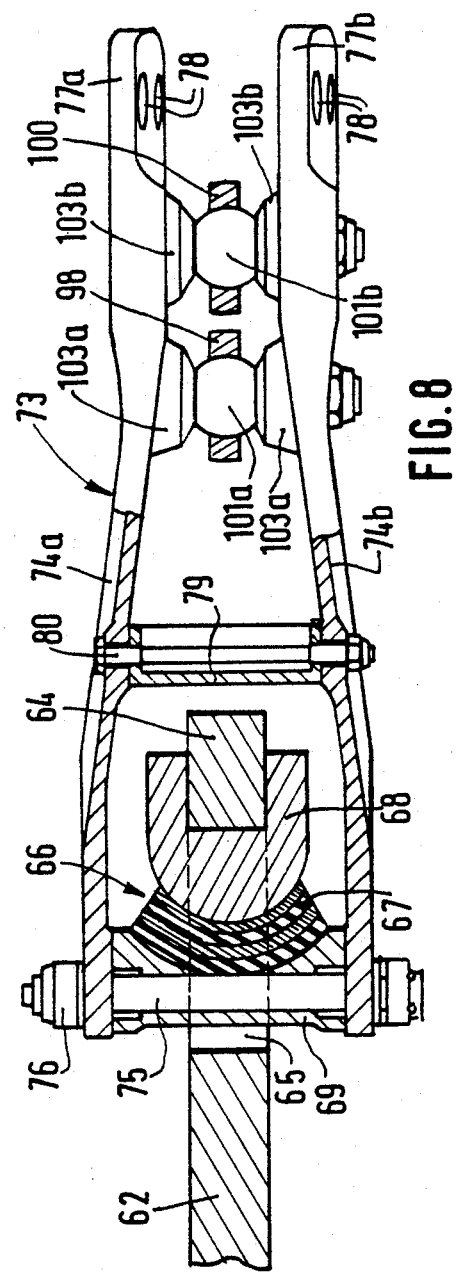
FIG. 8 is a schematic view in section through a vertical, substantially radial plane of the rotor head shown in FIG. 6, taken on the line VIII—VIII in FIG. 6.

The four-bladed rotor head shown schematically in FIGS. 6 and 8 comprises a hub 61 of a different type from those of the preceding examples, since this is a hub having single plate 62 disposed radially in relation to the axis of rotation A of the rotor and fastened to a central tubular hub body 63 driven to rotate about the axis A. The radial plate 62 is a substantially cruciform plate in which the outer radial end of each of the arms is slightly convex, while each arm is separated from a neighboring arm by a concave cavity. In addition, the plate 62 has in each of its arms, the number of which is equal to that of the blades, a cavity or cell 65 formed through the plate 62 in a direction parallel to the axis A and closed radially towards the outside by a rim 64 on the plate 62. Each of the four blades (not shown) is connected to the plate 62 of the hub 61 by a clevis 73 having two superimposed radial branches spaced apart in the direction of the axis A; the structure and arrangement of this clevis are substantially the same as in the case of the clevis 13 in the first two examples. As also shown in FIG. 8, the top and bottom branches 74a and 74b respectively of the clevis 73 are held to one another and on the plate 62, and at the same time articulated on the latter, by a single laminated spherical thrust bearing 66, whose structure is entirely similar to that of the laminated spherical thrust bearing 6 of the preceding examples; the alternating stack 67 of rigid spherical domes and layers of elastomer works with compression and shear of the elastomer between the outer radial frame 68, mounted as a bow on the rim 64 of the corresponding cavity 65 and bolted to said rim 64, and the inner radial frame 69 mounted as a brace between the branches 74a and 74b, to which it is held by two threaded bolts 75 cooperating with nuts 76. The whole arrangement comprising the frame 69, the bolts 75, the laminated stack 67, and the greater part of the inner frame 68 is substantially housed in the corresponding cavity 65 in the plate 62. As in the first example, the outer radial ends 77a and 77b of the branches 74a and 74b of the clevis 73 have formed in them two pairs of coaxial apertures 78, facing one another, for the passage of pins connecting the root of the corresponding blade to the clevis 73. The two branches 74a and 74b of the latter are also held to one another by a brace 79 mounted between these two branches radially on the outside of the rim 64 of the corresponding cavity 65 in the plate 62. This brace 79, which is held on the branches by bolts 80, also has laterally projecting from it, on each side of the pitch change axis X—X of the corresponding blade, feet 81 and 83 which are curved towards the plate 62 and carry lag stop surfaces facing lag stops 87 and 88 projecting from the outer radial face of the corresponding arm of the plate 62. One 83 of the transversal feet is extended to form a pitch control lever provided with a clevis 85 for connection to a pitch control connecting rod 86 lying substantially in the concave cavity separating said arm from an adjacent arm of the plate 62.

As in the preceding example, the hub 61 is surrounded by an interblade device consisting of resilient return ties with built-in damping, the number of which is equal to the number of blades and which are mounted in a ring around the radial plate 62. In this example, each of the four ties 89 is constructed very similarly to the ties 29' shown in FIG. 5, since it comprises an alternating stack of a rigid central plate 90 and rigid outer plates 91, together with two layers 92 of viscoelastic elastomer, an eyed end piece 93 extending the central plate 90 at one end of the tie 89, and a connection clevis 94 extending the two outer plates 91 at the other end of the tie 89. In addition, the mounting of each tie 89 on two neighboring clevises 73 each connecting blade to the hub is similar to the mounting of a tie 29' in FIG. 5 on two neighboring clevises 13', since a small connection sleeve 99 at one end of a connection arm 96 is fastened to the end clevis 94 of the tie 89, while a ball joint eye 98 provided at the other end of the connection arm 96 is directly mounted around one 101a of the two main balls 101a and 101b retained in the corresponding clevis 73, and a ball joint eye 100 at the end of the end piece 93 is directly mounted around the other 101b of the two main balls 101a and 101b likewise retained in the other corresponding clevis 73. However, in the example shown in FIGS. 6 and 8 the essential difference from the preceding example is that the two main balls 101a and 101b, by which each clevis 73 is connected to two adjacent ties 89, are radially offset along the pitch change axis X—X of the corresponding blade, while being separated from one another by the shortest possible distance, taking into account the requirements for the mechanical connection and clearances of surrounding components, each of these two main balls 101a and 101b being nevertheless centered on the pitch change axis X—X.

In FIGS. 6 and 8 each main central ball 101a and 101b is thus retained in the corresponding clevis 73, as in the previous examples, by a diametrical pin (not shown) whose axis is at right angles to the plane of rotation of the rotor (that is to say to the plane at right angles to the axis A and passing through the pitch change axis X—X), and which passes not only through the corresponding ball 101a or 101b but also through two bosses 103a or 103b which project from the branches 74a and 74b of the clevis 73 and which face one another towards the interior of the clevis 73. The corresponding ball 101a or 101b is disposed between said bosses in such a manner that its center is definitely on the pitch change axis X—X of the corresponding blade under the same conditions as the ball 41 lies between the bosses 43 in FIG. 2.

In addition, as shown in FIG. 6, each tie 89 is connected by the ball joint eye 100 on its end piece 93 to the ball 101b in the outer radial position on a connection clevis 73, and by the clevis 94 at its opposite end to the connection arm 96 connected to the ball 101a in the inner radial position on the other clevis 73 to which said tie 89 is connected.

In order to make possible this mounting of the balls 101a and 101b on the clevises 73, and also their connection to the ties 89, it is necessary for the axis of each ball joint eye 98 or 100 to be parallel to the center plane of the corresponding tie 89 and to be at right angles to the longitudinal axis of said tie 89, and therefore the axis of the clevis 94 and of the small sleeve 99 must be at right angles to the center plane of said tie 89.

Figure 7:
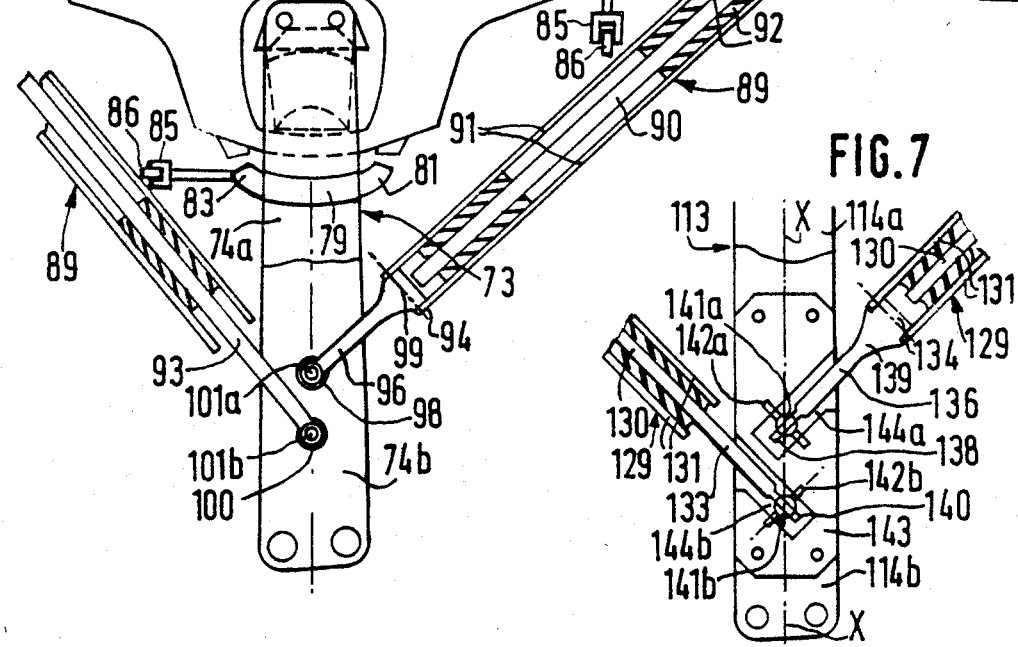
FIG. 7 is a partial view of a variant of the rotor head shown in FIG. 6, wherein the mounting of the main balls connecting the ties to each clevis connecting a blade to the hub has been modified.

Another possible mounting arrangement is illustrated schematically as a variant in FIG. 7, in which once again it can be seen that each clevis 113 connecting a blade to the hub is connected to two adjacent ties 129 by two main central balls offset radially in relation to each other along the pitch change axis X—X of the corresponding blade, each of them being centered on said axis X—X.

However, in this mounting arrangement the ball joint eye 140 at the end of the end piece 133 extending the rigid central plate 130 of each tie 129 is an eye whose axis is at right angles to the center plane of the tie 129, while a double clevis 134 fastens the outer rigid plates 131 at the other end of each tie 129 to the connection arm 136 by means of bolts (not shown).

The ball joint eye 138 of the connection arm 136 surrounds a main central ball 141a housed in a cavity 144a provided in a brace 143 fixed between the two branches 114a and 114b of the clevis 113, while the ball joint eye 140 at the end of the end piece 133 of the tie 129 directly surrounds the other main central ball 141b, which, like the ball 141a, is centered on the axis X—X but is offset radially on the outside of the ball 141a and also housed in a cavity 144b provided in the brace 143. Each of the cavities 144a and 144b forms a ball socket which opens laterally into a respective one of the sides of the brace 143 and of the clevis 113, being at the same time inclined radially towards the hub, in a direction which corresponds to that of the longitudinal axis of the corresponding tie 129 connected to the clevis 113 by the ball housed in the socket in question. Each of the balls 141a and 141b is retained in the corresponding socket 144a or 144b by a diametrical pin passing through the socket and retained in the opposite wall of the latter. The axis 142a or 142b of said pin is on the one hand at right angles to the lag axis of the corresponding blade, that is to say to the axis at right angles to the plane of the rotor and passing through the center of the laminated spherical thrust bearing, such as 66, which articulates the clevis 113 on the hub, and on the other hand is substantially at right angles to the longitudinal axis of the tie 129 connected by the ball 141a or 141b in question to the clevis 113.

As a variant, the brace 143 bolted between the branches 114a and 114b of the clevis 113 may be replaced by two different braces, each of which is also bolted between the branches 114a and 114b, and may have only one of the sockets 144a and 144b to house the sole corresponding ball 141a or 141b.

When each clevis connecting a blade to the hub is connected to each of the two adjacent ties by a respective one of two main balls, it is also possible, as a variant, for these two main balls to be, at one and the same time, offset radially relative to one another along the pitch change axis of the corresponding blade, and offset laterally relative to each other, one on each side of said pitch change axis. The two balls are then advantageously centered in the plane of rotation of the rotor, symmetrically to one another in relation to the point of intersection of the pitch change axis and the axis passing through the centers of the two balls. In this case both the radial spacing and the transverse spacing of the centers of the balls must be as close as possible, while being compatible with the mechanical members necessary for retaining the balls between the branches of the corresponding connection clevis, and also with the clearances of the mechanical members surrounding these balls.

Figure 9:
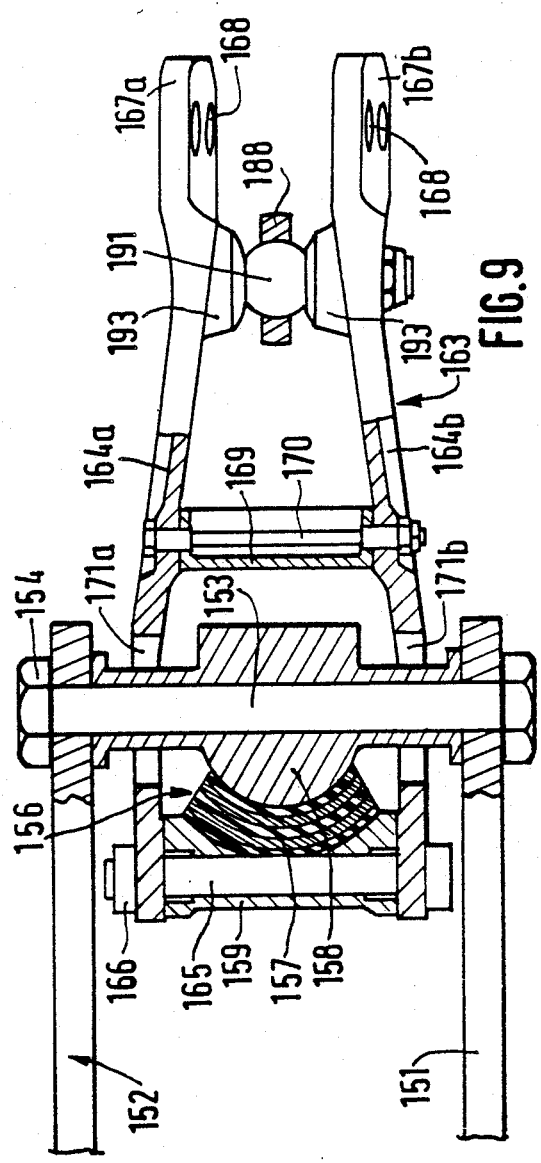
FIG. 9 is a view similar to FIG. 8 in the case of a rotor head whose hub comprises two radial plates spaced apart one above the other.

The mounting of an interblade connection device according to the invention, in which the resilient-return ties with built-in damping are connected, to the clevises connecting the blades to the hub, with the aid of a single main ball or of two main balls retained in each clevis and optionally centered on the pitch change axis of the corresponding blade, is not limited to rotor heads whose hub is one having a rim connected by spokes to a central hub body, or is one having a rim supported by an integrated tubular hub-mast unit, or one having a single circular or substantially polygonal radial plate provided with cavities housing the means retaining and articulating each clevis on the hub plate, as described for example in French Patent No. 78,16,521 of the Assignee. The interblade connection device according to the invention may in fact also be used with and mounted on rotor heads whose hub comprises two substantially radial plates disposed one above the other with spacing in the direction of the axis of rotation of the rotor, and having, for each rotor blade, two plate portions disposed facing each other and holding between them the inner radial end of the connection clevis and the means retaining and articulating said clevis on the hub plates. Hubs of this type, having two radial plates, are described for example in the Assignee's French Patent No. 79,11,585, and the cooperation of a hub of this kind with a connection clevis retaining a single main central ball for connection to two adjacent interblade ties is schematically illustrated in FIG. 9.

FIG. 9 shows once again a radial clevis 163 whose top and bottom branches 164a and 164b respectively retain the root of the corresponding blade between their outer radial ends 167a and 167b with the aid of pins passing through mutually facing holes 168. The two branches 164a and 164b are rigidly connected together in the middle zone by the brace 169 fixed by bolts 170 and carrying feet provided with lag stops and projecting laterally one on each side of the clevis 163; in addition, one of said feet is in the form of a pitch control lever. The two branches 164a and 164b are also connected to one another at their inner radial ends by assemblies comprising threaded bolts 165 and nuts 166, applying them on each side against the brace formed by the inner radial frame 159 of a laminated spherical thrust bearing 156. The outer radial frame 158 of the latter passes through cavities 171a and 171b formed respectively in the top branch 164a and bottom branch 164b, in such a manner that this outer radial frame 158 can be mounted as a brace between radial arms 151 and 152 belonging respectively to a bottom radial plate and an upper radial plate of the hub. The outer radial frame 158 is held in position between the arms 151 and 152 of the hub by bolts 153, 154; the center of the alternating stack 157 of rigid cups and elastomer layers of the laminated spherical thrust bearing 156 is situated in the plane passing through the axis of the bolts 153. As in the example shown in FIGS. 1 and 2, a main central ball 191 is retained between the internal bosses 193 of the branches 164a and 164b of the clevis by means of a diametrical pin (not shown), and this ball 191, centered on the pitch change axis of the corresponding blade, is surrounded by a ball joint eye 188 on a connection member (V-shaped bent lever) at the adjacent ends of two neighboring ties connected to clevis 163 under the same conditions as in the example shown in FIGS. 1 and 2. In this example the assembly comprising the inner radial end part of the clevis 163 and the laminated spherical thrust bearing 156 is housed between the mutually facing radial arms 151 and 152 of the hub plates, and the cavities 171a and 171b of the branches of the clevis 163 permit angular flapping, lag and pitch movements of the clevis 163 with the corresponding blade about the center of the laminated spherical thrust bearing 156, without any interference by said clevis 163 with the brace-shaped outer radial frame 158 of said laminated thrust bearing 156.

In all the embodiments of the invention each of the ties thus makes it possible to introduce a powerful resilient return, as well as a damping, into the angular lag movements of the blades relative to one another, these angular out-of-phase lag movements being completely disconnected from the angular pitch and flapping movements, so that in particular the controlled pitch change oscillations of the blades give rise to no stressing of the interblade ties, and vice versa. Moreover, the interblade mounting of the ties has several highly beneficial effects in respect of forces taken and of resistance, since the lever arm is substantially doubled, despite the compactness of the mounting arrangement, in comparison with previous constructions, and this results in the halving of the forces transmitted and the reduction to one quarter of the rigidity required in the ties. In addition, the balls and the ties are now subjected only to low static loads, and the phase shift between the cyclic pitch and the flapping of the blades eliminates a large part of the dynamic swiveling. The absence of pitch-lag coupling eliminates loads induced by the ties in pitch control and, in comparison with prior constructions utilizing braces connected on the one hand to the blade root or to the member connecting the blade to the hub, and on the other hand to the hub, the number of connections permitting the introduction of loads on the hub is reduced by half, whether the hub is composite or metallic. Furthermore, holes and unevenness of shape are eliminated in the most critical zones of the hub, since the ties are not connected to the hub. This is of particular interest when the hub is of composite material. Moreover, with regard to each laminated spherical thrust bearing retaining and articulating the clevis connecting a blade to the hub, the axial dynamic load and the static lag load are eliminated, to the detriment of the dynamic lag load, which is increased, although this increase is not critical in comparison with the dynamic lag load found in modern rotors having hubs of composite material. The vertical arrangement of the ties having a plane overall shape, as well as their low mass, has the consequence that the effects of the cetrifugal forces to which they are subjected are negligible.

The mounting of the interblade ties is also very beneficial in respect of reliability and maintenance, since the ties, being of simple construction and easily capable of visual inspection, are easily dismantled, which also applies to the balls connecting them to the clevises; these balls have a long life because they are less highly loaded and are subjected only to movements of low amplitude.

Moreover, the mass of the rotor head can be reduced because of the absence of a member connecting the ties to the hub, because of the construction of the ties in light alloy and elastomer, because of the short radius of attachment of the blades, and finally because of the reduced eccentricity of flapping, particularly when the rotor head comprises an integrated tubular hub-mast unit in which the rim is relatively close to the axis of rotation of the rotor, so that the distance between the lag and flapping axes and the center of rotation of the rotor is short.

Substantially for the same reasons, the production cost of a rotor head of this kind is reduced because of the absence of the member connecting the ties to the hub and because of the very simple technology for the production of the ties.

Although the radius of attachment of the blades can be reduced because of the interblade mounting of the ties, it is possible for the four or five blades of the rotors described above to be folded back, provided that corresponding provision is made at the bottom part of the top curved fairing of the rotor head, when such fairing is fitted.

Because of the short radius of attachment of the blades, the maximum cross-section of a five-bladed rotor head provided with interblade ties remains relatively small, so that aerodynamic lag is limited.

It will readily be understood that the mounting of the interblade ties according to the invention is particularly interesting for a rotor head having four or five or even more blades, particularly when the blades are connected to a very compact integrated tubular hubmast unit, preferably one of composite material.

I claim:

1. A rotary-wing aircraft rotor head, of the type comprising a hub to which each blade of the rotor is held by a connection member fixed to the blade and connected to the hub with the aid of articulation means permitting angular oscillations of the blade about a single point on which the flapping axis, the lag axis and the longitudinal pitch change axis of the blade are convergent, the rotor head also comprising an interblade connection device consisting of elongated resilient-return ties with built-in damping, the number of which ties is equal to that of the blades and which are mounted substantially in a ring around the hub, so that each of them connects together two neighboring blades of the rotor, each tie comprising at least two rigid elongated members, each of which is provided with means for the articulated connection of a respective end of the tie to a respective one of the two blades connected by said tie, and which are connected to one another by at least one resilient return member of the two rigid members, for return to a relative initial position, and by at least one member damping all relative movement of the two rigid members, at least in the longitudinal direction of the tie, wherein said means for the articulated connection of each tie to a blade comprise a main ball whose center is situated on or in immediate proximity to the longitudinal pitch axis of the blade and which is retained, on the means connecting the blade to the hub, radially on the outside, relative to the center of the hub, of the point of intersection of the lag, flapping and pitch change axes, which point constitutes the single center of articulation of the connection means on the hub.

2. A rotor head as claimed in claim 1, wherein said means articulating the connection member of a blade on the hub comprise a thrust bearing articulation of the laminated spherical type constituting at one and the same time the member retaining the blade against centrifugal force and a flapping articulation, a lag articulation, and a pitch articulation, with its center at the intersection of the flapping, lag and pitch axes of the corresponding blade.

3. A rotor head as claimed in claim 1 wherein the means for the articulated connection of two neighboring ties on one and the same blade comprise a single main ball whose center is situated on the pitch change axis of the blade.

4. A rotor head as claimed in claim 3, wherein said single main ball is connected to the adjacent ends of two neighboring ties by a rigid connection member comprising two arms radially inclined towards the hub and disposed laterally one on one side and the other on the other side of the pitch change axis of the blade, the two arms being attached to one another by a ball eye surrounding the main ball, and the free end of one of the arms being connected to the adjacent end of the tie situated on the corresponding side of the pitch axis of the blade by connection means making a secondary articulated connection, in such a manner that in the relative initial position of the rigid members of each tie the centers of the main balls connecting each tie to the two corresponding blades and the center of the secondary articulated connection of each tie to the corresponding arm of the members making the connection to the two corresponding blades are substantially aligned on the longitudinal axis of the tie.

5. A rotor head as claimed in claim 4, wherein the connection member has the shape of a V open towards the hub, with the free end of one of the arms in the form of a pivot clevis on the adjacent end of a tie, the pivoting axis of the clevis on the end of the arm being parallel to the lag axis of the corresponding blade.

6. A rotor head as claimed in claim 5, wherein a connection eye fastened to one of the rigid members of a tie is engaged and retained between the two branches of an end clevis of an arm of a connection member, whose other arm has an end piece engaged in and fastened to the two branches of a connection clevis fastened to at least one other rigid member of a neighboring tie.

7. A rotor head as claimed in claim 6, wherein said connection eye of a tie is retained in the end clevis of an arm of a connection member by a secondary ball of laminated elastomer.

8. A rotor head as claimed in claim 1, where in the means for the articulated connection of each of two neighboring ties on one and the same blade comprise a respective one of two main balls disposed on the corresponding connection member symmetrically, one on each side of the pitch change axis of the blade, each of these balls being connected to the tie situated on the same side of the pitch change axis as the ball in question by means of a ball eye surrounding the ball in question and separated from the other ball eye only by a slight transverse clearance at right angles to the pitch change axis of the blade.

9. A rotor head as claimed in claim 1, wherein the means for the articulated connection of each of two neighboring ties on one and the same blade comprise a respective one of two main balls disposed on the corresponding connection member in positions radially offset along the pitch change axis of the blade, each of these balls being connected to a respective one of said neighboring ties by a ball eye surrounding it.

10. A rotor head as claimed in claim 9, wherein said main balls are radially offset along the pitch change axis of the blade and are each centered on said axis.

11. A rotor head as claimed in claim 9, wherein the main ball connecting one end of each tie to the member connecting a blade to the hub is radially on the outside of the other main ball held on the member connecting the blade to the hub, while the main ball connecting the other end of the tie to the member connecting a neighboring blade to the hub is radially on the inside of the other main ball held on the member connecting the neighboring blade to the hub.

12. A rotor head as claimed in claim 8, wherein at least one ball eye held on a connection member, connecting a blade to the hub, by one of the two corresponding main balls is directly fastened to at least one of the two rigid members of the tie articulated on said connection member by the corresponding main ball.

13. A rotor head as claimed in claim 8, wherein at least one ball eye held on a member connecting a blade to the hub by one of the two corresponding main balls has a connection arm fastened to at least one rigid member of the tie connected to said connection member by the corresponding main ball.

14. A rotor head as claimed in claim 1, wherein each tie comprises an elongated central rigid plane plate engaged at least partially between two external rigid plane plates, which are elongated in the same direction and to each of which the central plate is connected by a layer of a viscoelastic material bonded to the two plates connected together by it, the central plate being provided with an end piece having a pivot eye extending on one side, in the direction of the elongated plates, beyond the outer plates, while the latter have on the other side in the direction of the elongated plates, and beyond the inner plate, a clevis for fastening by means of at least two bolts to an end piece of an arm making the connection to a main ball, each tie being mounted between two blades in such a manner that the plane of the plates is substantially parallel to the lag axes of the two blades.

15. A rotor head as claimed claim 1, wherein each member connecting a blade to the hub carries, radially on the inside of each main ball held by it, two feet projecting laterally relative to the connection member and extending in the one case on one side and in the other case on the other side of the pitch change axis of the corresponding blade, each of these two lateral feet having a stop surface facing the hub and intended to come to bear against one of two lag stop surfaces which are directed towards the outside of the hub and towards the end of the corresponding blade, and each of which is provided on a respective one of two projecting bosses on the outer radial face of the hub and laterally on each side of said connection member and of the corresponding articulation means, in order to limit the lag deflections of the blade on the starting and stopping of the rotation of the rotor, through the direct bearing of the stop surface of a lateral foot against a lag stop surface of the hub.

16. A rotor head as claimed in claim 15, wherein one of the two lateral feet of each connection member is extended laterally beyond the corresponding stop surface and is shaped as a lever controlling the pitch of the corresponding blade.

17. A rotor head as claimed in claim 1, wherein each member connecting a blade to the hub is a radial clevis comprising an upper branch and a lower branch, which are disposed facing one another and are spaced apart in the direction of the lag axis of the corresponding blade, and the outer radial ends of which are integral with the corresponding blade root, which is forked, or retain between them the root of the corresponding blade, while their inner radial ends are fastened to an inner radial frame of the means effecting the articulation on the hub, which means also have an outer radial frame fixed on a part of the hub and disposed between the two branches of the clevis, each of the corresponding main balls being retained and substantially housed between the two branches of the clevis, radially between their outer radial ends and the outer radial frame, which is also disposed between them.

18. A rotor head as claimed in claim 17, wherein each main ball is on the one hand housed between two bosses projecting towards one another on the face of a respective one of the branches of the clevis which faces the other branch, and on the other hand is retained by a diametrical pin whose axis is parallel to the lag axis of the blade and which passes through the ball and the bosses and is fixed on the two branches.

19. A rotor head as claimed in claim 8, wherein each member connecting a blade to the hub is a radial clevis comprising an upper branch and a lower branch, which are disposed facing one another and are spaced apart in the direction of the lag axis of the connecting blade, and the outer radial ends of which are integral with the corresponding blade root, which is forked, or retain between them the root of the corresponding blade, while their inner radial ends are fastened to an inner radial frame of the means effecting the articulation on the hub, which means also have an outer radial frame fixed on a part of the hub and disposed between the two branches of the clevis, each of the corresponding main balls being retained and substantially housed between the two branches of the clevis, radially between their outer radial ends and the outer radial frame, which is also disposed between them and wherein each main ball is housed in a part mounted as a brace between the two branches of the clevis and having at least one ball socket which opens laterally towards one side of the clevis and towards the hub and in which a main ball is retained about a diametrical axis at right angles to the lag axis of the blade and substantially at right angles to the longitudinal axis of the tie which this ball connects to the clevis.

20. A rotor head as claimed in claim 19, wherein each of the two main balls is received and retained in a respective one of two separate parts mounted as braces between the two branches of the clevis.

21. A rotor head as claimed in claim 15, wherein each member connecting a blade to the hub is a radial clevis comprising an upper branch and a lower branch, which are disposed facing one another and are spaced apart in the direction of the lag axis of the corresponding blade, and the outer radial ends of which are integral with the corresponding blade root, which is forked, or retain between them the root of the corresponding blade, while their inner radial ends are fastened to an inner radial frame of the means effecting the articulation on the hub, which means also have an outer radial frame fixed on a part of the hub and disposed between the two branches of the clevis, each of the corresponding main balls being retained and substantially housed between the two branches of the clevis, radially between their outer radial ends and the outer radial frame, which is also disposed between them and wherein the two lateral feet provided with the stop surfaces, and where applicable with the pitch control lever, are made as a single piece, which is mounted as a brace between the branches of the clevis, to which branches it is fixed in a radial position between the main ball or balls and that part of the hub to which the outer radial frame of the corresponding articulation means is fixed.

22. A rotor head as claimed in claim 1, which comprises a hub provided with a rigid peripheral rim of circular or substantially polygonal shape, the side or apices of which are rounded and which is fixed for rotation with a rotor-mast unit about the axis of rotation of the rotor, and wherein said articulation means of each member connecting a blade to the hub are substantially housed inside the rim and connect said connection member to a part of said rim of the hub.

23. A rotor head as claimed in claim 22, which comprises an integrated tubular hub-mast unit having said rim in its top portion and being provided for each blade with at least one opening formed in the hub-mast unit in a position substantially adjacent the rim, while a part of the corresponding connection member passes through said opening in order to connect the blade, outside the hub-mast unit, to the corresponding articulation means, inside the hub-mast unit.

24. A rotor head as claimed in claim 22, which is provided with a top curved fairing covering the upper part of the hub and having cavities for the passage of the means connecting the blades to the hub, said fairing preferably being mounted floating on the ring of ties and being connected by silentblocs at its periphery to arms connecting ties to the corresponding main balls.

25. A rotor head as claimed in claim 1, which comprises a hub having a substantially radial plate of substantially circular or substantially polygonal shape, which has rounded sides or apices and which is fixed for rotation with a rotor-mast unit about the axis of rotation of the rotor, the plate having formed in it a number of cavities equal to the number of blades, while the articulation means of the member connecting a blade to the hub are at least partially housed in the corresponding cavity and bear against the outer radial edge of said cavity, being connected to the blade by a top part and a bottom part of said connection member, said parts extending respectively above and below the plate.

26. A rotor head as claimed in claim 1, which comprises a hub having two substantially radial plates fixed for rotation with a rotor-mast unit about the axis of rotation of the rotor and spaced apart in the direction of the axis of rotation of the rotor, so that for each blade they have two outer radial plate parts facing one another, between which are retained the articulation means of the corresponding member making the connection to the hub, as well as at least an inner radial part of said connection member.

* * * * *